US011624636B2

(12) United States Patent
    Scilingo

(10) Patent No.: US 11,624,636 B2
(45) Date of Patent: Apr. 11, 2023

(54) TURBINE DESIGN FOR FLOW METER

(71) Applicant: Flo Technologies, Inc., Culver City, CA (US)

(72) Inventor: Jeffrey A. Scilingo, Rancho Palos Verdes, CA (US)

(73) Assignee: FORTUNE BRANDS WATER INNOVATIONS LLC, North Olmsted, OH (US)

(*) Notice: Subject to any disclaimer, the term of this patent is extended or adjusted under 35 U.S.C. 154(b) by 142 days.

(21) Appl. No.: 15/929,477

(22) Filed: May 4, 2020

(65) Prior Publication Data
US 2020/0355527 A1    Nov. 12, 2020

Related U.S. Application Data

(60) Provisional application No. 62/844,298, filed on May 7, 2019.

(51) Int. Cl.
    *G01F 1/10*    (2006.01)
(52) U.S. Cl.
    CPC ..................... *G01F 1/10* (2013.01)
(58) Field of Classification Search
    CPC .................. G01F 1/10; G01F 1/053
    See application file for complete search history.

(56) References Cited

U.S. PATENT DOCUMENTS

| 2,832,218 A | 4/1958 | White |
| 2,907,208 A | 10/1959 | Taylor |
| 2,930,136 A | 3/1960 | Knudsen |
| 3,036,461 A | 5/1962 | Baranowski, Jr. |
| 3,085,781 A | 4/1963 | La Pointe |
| 3,164,020 A * | 1/1965 | Groner ............ G01F 1/10 73/861.78 |
| 3,651,544 A | 3/1972 | Soma |
| 3,701,277 A * | 10/1972 | McMahon ........ G01F 1/0755 73/861.87 |

(Continued)

FOREIGN PATENT DOCUMENTS

| DE | 3206433 A1 | 9/1983 |
| DE | 196 26 083 A1 | 1/1998 |

(Continued)

OTHER PUBLICATIONS

Johnson Controls, Inc. Vales and Actuators Catalog, 2014, https://www.johnsoncontrols.com/buildings/hvac-controls/valves-and-actuators.

*Primary Examiner* — Erika J. Villaluna
(74) *Attorney, Agent, or Firm* — Calfee, Halter & Griswold LLP

(57) ABSTRACT

A turbine wheel used in a turbine flow meter includes a hub configured to be freely rotatably fixed in position inside a fluid pipe section. A first cylindrical rim is centered about the hub and the longitudinal axis and spaced a distance apart from the hub. A first vane set extends outwardly from the hub to the first cylindrical rim, wherein a root of each vane of the first vane set is attached to the hub and a tip of each vane of the first vane set is attached to the first cylindrical rim. The first vane set may consist of one or two individual vanes. An external vane set may extend outwardly from the first cylindrical rim, wherein a root of each vane is attached to the first cylindrical rim and a tip of each vane is not attached to any cylindrical rim.

28 Claims, 14 Drawing Sheets

(56) References Cited

U.S. PATENT DOCUMENTS

| | | |
|---|---|---|
| 4,313,595 A | 2/1982 | Markley et al. |
| 4,418,712 A | 12/1983 | Braley |
| 4,488,567 A | 12/1984 | Grant |
| 4,546,671 A | 10/1985 | Fry |
| 4,637,423 A | 1/1987 | Gray |
| 4,658,651 A | 4/1987 | Le |
| 4,715,234 A | 12/1987 | Allen et al. |
| 4,719,939 A | 1/1988 | Killian |
| 5,038,268 A | 8/1991 | Krause |
| 5,038,821 A | 8/1991 | Maget |
| 5,158,483 A | 10/1992 | Fishman et al. |
| 5,600,071 A | 2/1997 | Sooriakumar |
| 5,660,198 A | 8/1997 | McClaran |
| 5,821,636 A | 10/1998 | Baker |
| 5,927,400 A | 7/1999 | Bononi et al. |
| 5,971,011 A | 10/1999 | Price |
| 6,161,568 A | 12/2000 | Dragotta |
| 6,206,337 B1 | 3/2001 | Veillet, Jr. |
| 6,209,576 B1 | 4/2001 | Davis |
| 6,539,968 B1 | 4/2003 | White |
| 6,581,484 B1 | 6/2003 | Schuler |
| 6,662,821 B2 | 12/2003 | Jacobsen et al. |
| 6,701,951 B1 | 3/2004 | Drinkwater |
| 6,789,411 B2 | 9/2004 | Roy |
| 6,963,808 B1 | 11/2005 | Addink et al. |
| 6,994,309 B2 | 2/2006 | Fernandez-Sein |
| 7,066,192 B1 | 6/2006 | Delaney et al. |
| 7,119,698 B2 | 10/2006 | Schleich et al. |
| 7,284,435 B2 | 10/2007 | Ueno |
| 7,304,587 B2 | 12/2007 | Boaz |
| 7,317,404 B2 | 1/2008 | Cumeralto et al. |
| 7,330,796 B2 | 2/2008 | Addink et al. |
| 7,360,413 B2 | 4/2008 | Jeffries et al. |
| 7,383,721 B2 | 6/2008 | Parsons et al. |
| 7,426,875 B1 | 9/2008 | McMillan |
| 7,650,801 B2 | 1/2010 | Kuhlemann |
| 7,920,983 B1 | 4/2011 | Peleg et al. |
| 7,966,099 B2 | 6/2011 | Fima |
| 7,969,318 B2 | 6/2011 | White et al. |
| 8,347,427 B2 | 1/2013 | Klicpera |
| 8,701,703 B2 | 4/2014 | Scott et al. |
| 8,857,466 B1 | 10/2014 | Wilson |
| 8,887,324 B2 | 11/2014 | Klicpera |
| 9,016,662 B2 | 4/2015 | Staffiere et al. |
| 9,019,120 B2 | 4/2015 | Broniak et al. |
| 9,266,136 B2 | 2/2016 | Klicpera |
| 9,297,150 B2 | 3/2016 | Klicpera |
| 9,494,480 B2 | 11/2016 | Klicpera |
| 9,749,792 B2 | 8/2017 | Klicpera |
| 9,857,805 B2 | 1/2018 | Halimi |
| 2005/0016592 A1 | 1/2005 | Jeromson et al. |
| 2005/0081642 A1 | 4/2005 | Nehl et al. |
| 2006/0028355 A1 | 2/2006 | Patterson et al. |
| 2006/0202051 A1 | 9/2006 | Parsons et al. |
| 2007/0068225 A1 | 3/2007 | Brown |
| 2007/0289635 A1 | 12/2007 | Ghazarian et al. |
| 2008/0300803 A1 | 12/2008 | Drake et al. |
| 2009/0090661 A1 | 4/2009 | Tanner et al. |
| 2010/0212748 A1 | 8/2010 | Davidoff |
| 2011/0114202 A1 | 5/2011 | Goseco |
| 2011/0132085 A1 | 6/2011 | Chiou |
| 2011/0178644 A1 | 7/2011 | Picton |
| 2011/0303311 A1 | 12/2011 | Klicpera |
| 2011/0308320 A1 | 12/2011 | Rocznik |
| 2013/0036796 A1 | 2/2013 | Fleury, Jr. |
| 2013/0047736 A1 | 2/2013 | Papadeas |
| 2013/0218174 A1 | 8/2013 | Bjerken |
| 2013/0248045 A1 | 9/2013 | Williams |
| 2013/0306157 A1 | 11/2013 | Aylon |
| 2014/0130878 A1 | 5/2014 | Marinez |
| 2014/0230924 A1 | 8/2014 | Kochan, Jr. |
| 2014/0230925 A1 | 8/2014 | Halimi |
| 2014/0264111 A1 | 9/2014 | Porter |
| 2014/0306828 A1 | 10/2014 | Trescott |
| 2014/0341255 A1 | 11/2014 | Kaiser |
| 2015/0348395 A1 | 12/2015 | Trout |
| 2018/0136673 A1 | 5/2018 | Halimi |
| 2018/0259982 A1 | 9/2018 | Halimi |

FOREIGN PATENT DOCUMENTS

| | | |
|---|---|---|
| GB | 2 499 059 A | 8/2013 |
| WO | 2013179019 A1 | 12/2013 |

* cited by examiner

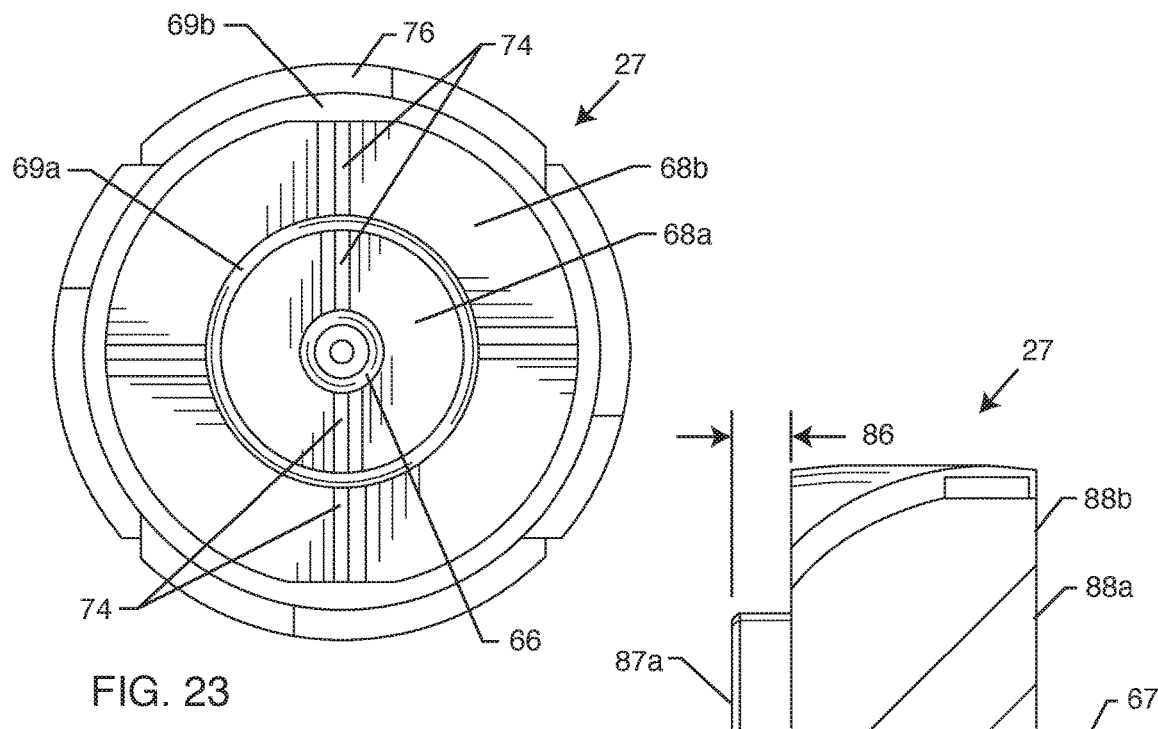
FIG. 23
FIG. 24
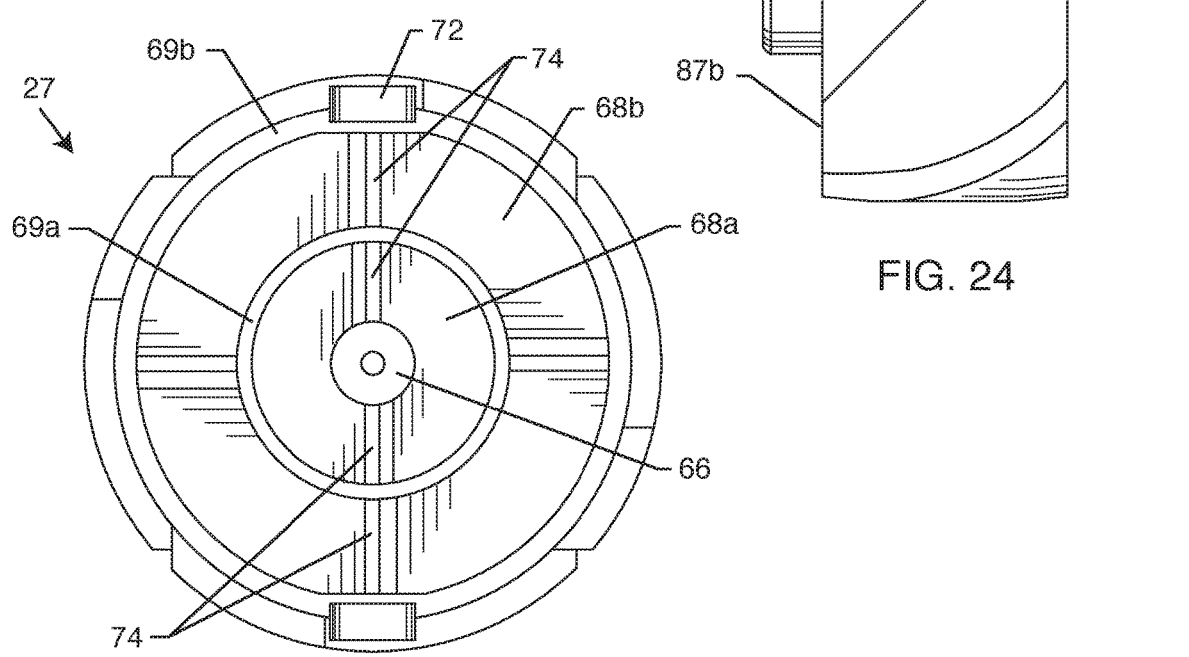
FIG. 25

TURBINE DESIGN FOR FLOW METER

CROSS-REFERENCE TO RELATED APPLICATIONS

This non-provisional patent application claims priority to provisional patent application 62/844,298 filed on May 7, 2019, the entire contents of which are hereby incorporated in full by this reference.

DESCRIPTION

Field of the Invention

The present invention generally relates to flow meters. For example, one aspect of the present invention relates to improvements in the turbine design of a flow meter enabling lower flow rates to be detected, reducing fouling and other associated improvements.

Background of the Invention

Turbine flowmeters use the mechanical energy of the fluid to rotate a rotor in the flow stream. Vanes (i.e. blades) on the rotor (i.e. turbine wheel, flow turbine, flow sensor) are configured with angled or helical form to transform energy from the flow stream into rotational energy. The rotor shaft spins on bearings. When the fluid moves faster, the rotor spins proportionally faster.

Shaft rotation can be sensed mechanically or by detecting the movement of the vanes. Vane movement is often detected magnetically. In certain embodiments, individual vanes are metallic or are embedded with a piece of metal, with each vane or embedded piece of metal generating a pulse detected by electronic sensors. In other embodiments and as applied in current presented art, one or more magnets are positioned diametrically around the turbine wheel. Turbine flowmeter sensors are typically located external to the flowing stream to avoid material of construction constraints that would result if wetted sensors were used. When the fluid moves faster, more pulses are generated. The pulse signal frequency is used to determine the flow rate of the fluid. Transmitters and sensing systems are available to sense flow direction in both the forward and reverse flow directions.

However, turbine flowmeters have reduced accuracy at low flow rates due to rotor/bearing drag that slows the rotor. For standard use, provisions for filtering are recommended to avoid particulates causing wear or fouling of the turbine wheel.

SUMMARY OF THE INVENTION

An exemplary embodiment of the present invention includes a turbine wheel 27 configured for use in a turbine flow meter, the turbine wheel comprising: a hub 66 centered about and defining a longitudinal axis 67, wherein the hub is configured to be freely rotatably fixed in position inside a fluid pipe section 33; a first cylindrical rim 69a centered about the hub and the longitudinal axis and spaced a distance apart from the hub; a first vane set 68a extending outwardly from the hub to the first cylindrical rim, wherein a root 70 of each vane of the first vane set is attached to the hub and a tip 71 of each vane of the first vane set is attached to the first cylindrical rim.

In other variations of the exemplary embodiment, the first vane set may consist of one individual vane. Alternatively, the first vane set may consist of two individual vanes.

An external vane set 76 may extend outwardly from the first cylindrical rim, wherein a root of each vane of the external vane set is attached to the first cylindrical rim and a tip of each vane of the external vane set is not attached to any cylindrical rim.

A pocket 72 may be formed in the first cylindrical rim, and including a magnet 28 or a magnetically-permeable ferrous part 28 disposed within the pocket.

The turbine wheel may be a single-shot, plastic injection molded, homogeneous part. The turbine wheel may consist of a specific gravity at or between 0.9 to 1.0. The turbine wheel may consist of a polypropylene homopolymer.

A second cylindrical rim 69b may be centered about the hub and the longitudinal axis and spaced radially a distance apart from the first cylindrical rim, wherein the first and second cylindrical rims are concentrically disposed in relation to one another, and including a second vane set 68b extending outwardly from the first cylindrical rim to the second cylindrical rim, wherein a root of the each vane of the second vane set is attached to the first cylindrical rim and a tip of each vane of the second vane set is attached to the second cylindrical rim.

The first vane set may consist of two individual vanes and the second vane set consists of four individual vanes.

The first vane set may consist of two individual vanes and the second vane set comprises more than two individual vanes.

The first vane set may consist of one individual vane and the second vane set comprises more than one individual vane.

The first vane set may have a lower individual vane count in comparison to the second vane set.

A pocket 72 may be formed in the second cylindrical rim, and include a magnet 28 or a magnetically-permeable ferrous part 28 disposed within the pocket.

A leading edge 87a of the first cylindrical rim may extend a distance 86 in front of a leading edge 87b of the second cylindrical rim.

The turbine wheel may be a single-shot, plastic injection molded, homogeneous part.

An external vane set 76 may extend outwardly from the second cylindrical rim, wherein a root of each vane of the external vane set is attached to the second cylindrical rim and a tip of each vane of the external vane set is not attached to any cylindrical rim.

Another exemplary embodiment of the present invention is best shown in FIGS. 20-25, where a turbine wheel 27 is configured for use in a turbine flow meter, the turbine wheel comprising: a hub 66 centered about and defining a longitudinal axis 67, wherein the hub is configured to be freely rotatably fixed in position inside a fluid pipe section 33; a first cylindrical rim 69a centered about the hub and the longitudinal axis and spaced a distance apart from the hub; a first vane set 68a extending outwardly from the hub to the first cylindrical rim, wherein a root 70 of each vane of the first vane set is attached to the hub and a tip 71 of each vane of the first vane set is attached to the first cylindrical rim; a second cylindrical rim 69b centered about the hub and the longitudinal axis and spaced radially a distance apart from the first cylindrical rim, wherein the first and second cylindrical rims are concentrically disposed in relation to one another; a second vane set 68b extending outwardly from the first cylindrical rim to the second cylindrical rim, wherein a root of the each vane of the second vane set is attached to the first cylindrical rim and a tip of each vane of the second vane set is attached to the second cylindrical rim.

In other variations of the exemplary embodiment, the first vane set may have a lower individual vane count in comparison to the second vane set.

A third vane set 76 may extend outwardly from the second cylindrical rim, wherein a root of each vane of the third vane set is attached to the second cylindrical rim and a tip of each vane of the third vane set is not attached to any cylindrical rim.

A pocket 72 may be formed in the second cylindrical rim, and including a magnet 28 or a magnetically-permeable ferrous part 28 disposed within the pocket.

A leading edge 87a of the first cylindrical rim may extend a distance 86 ahead of a leading edge 87b of the second cylindrical rim.

The turbine wheel may be a single-shot, plastic injection molded, homogeneous part.

The first vane set may consist of two individual vanes and the second vane set consists of four individual vanes.

The first vane set may consist of two individual vanes and the second vane set comprises more than two individual vanes.

The first vane set may consist of one individual vane and the second vane set comprises more than one individual vane.

Another exemplary embodiment of the present invention is best shown in FIGS. 14-19, where a turbine wheel 27 is configured for use in a turbine flow meter, the turbine wheel comprising: a hub 66 centered about and defining a longitudinal axis 67, wherein the hub is configured to be freely rotatably fixed in position inside a fluid pipe section 33; a first cylindrical rim 69a centered about the hub and the longitudinal axis and spaced a distance apart from the hub; a first vane set 68a extending outwardly from the hub to the first cylindrical rim, wherein a root 70 of each vane of the first vane set is attached to the hub and a tip 71 of each vane of the first vane set is attached to the first cylindrical rim, wherein the first vane set consists of two individual vanes; and an external vane set extending outwardly from the first cylindrical rim, wherein a root of each vane of the external vane set is attached to the first cylindrical rim and a tip of each vane of the external vane set is not attached to any cylindrical rim.

In other variations of the exemplary embodiment the turbine wheel may be a single-shot, plastic injection molded, homogeneous part.

A pocket may be formed in the first cylindrical rim, and including a magnet or a magnetically-permeable ferrous part disposed within the pocket.

An axle thru-hole 65 may be disposed through the hub along the longitudinal axis, and including a turbine shaft disposed through the axle thru-hole.

Another exemplary embodiment of the present invention is best shown in FIGS. 26-29, where a flow rate sensor, comprises: a fluid pipe section 33 including a fluid inlet 35 and a fluid outlet 34 configured to be connectable in series to a fluid pipe 36; a turbine wheel freely disposed inside a fluid pipe section, the turbine wheel comprising: a hub centered about and defining a longitudinal axis, wherein the hub is freely rotatably fixed in position relative to the fluid pipe section; a first cylindrical rim centered about the hub and the longitudinal axis and spaced a distance apart from the hub; a first vane set extending outwardly from the hub to the first cylindrical rim, wherein a root of each vane of the first vane set is attached to the hub and a tip of each vane of the first vane set is attached to the first cylindrical rim; a pocket formed in the first cylindrical rim; and a magnet or a magnetically-permeable ferrous part disposed within the pocket; a first sensor and a second sensor attached relative to and disposed outside of the fluid pipe section, wherein the first and the second sensors are disposed near the magnet or the magnetically-permeable ferrous part, the first and second sensor configured to detect a movement of the magnet or magnetically-permeable ferrous part; wherein the first and the second sensor are positioned where an included angle from the longitudinal axis of the turbine wheel to a center of each sensor is other than 180 degrees.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 23 is front view of the turbine wheel of FIG. 20;

FIG. 24 is a side view of the turbine wheel of FIG. 20;

FIG. 25 is a rear view of the turbine wheel of FIG. 20;

DETAILED DESCRIPTION OF THE PREFERRED EMBODIMENTS

Figure 1:
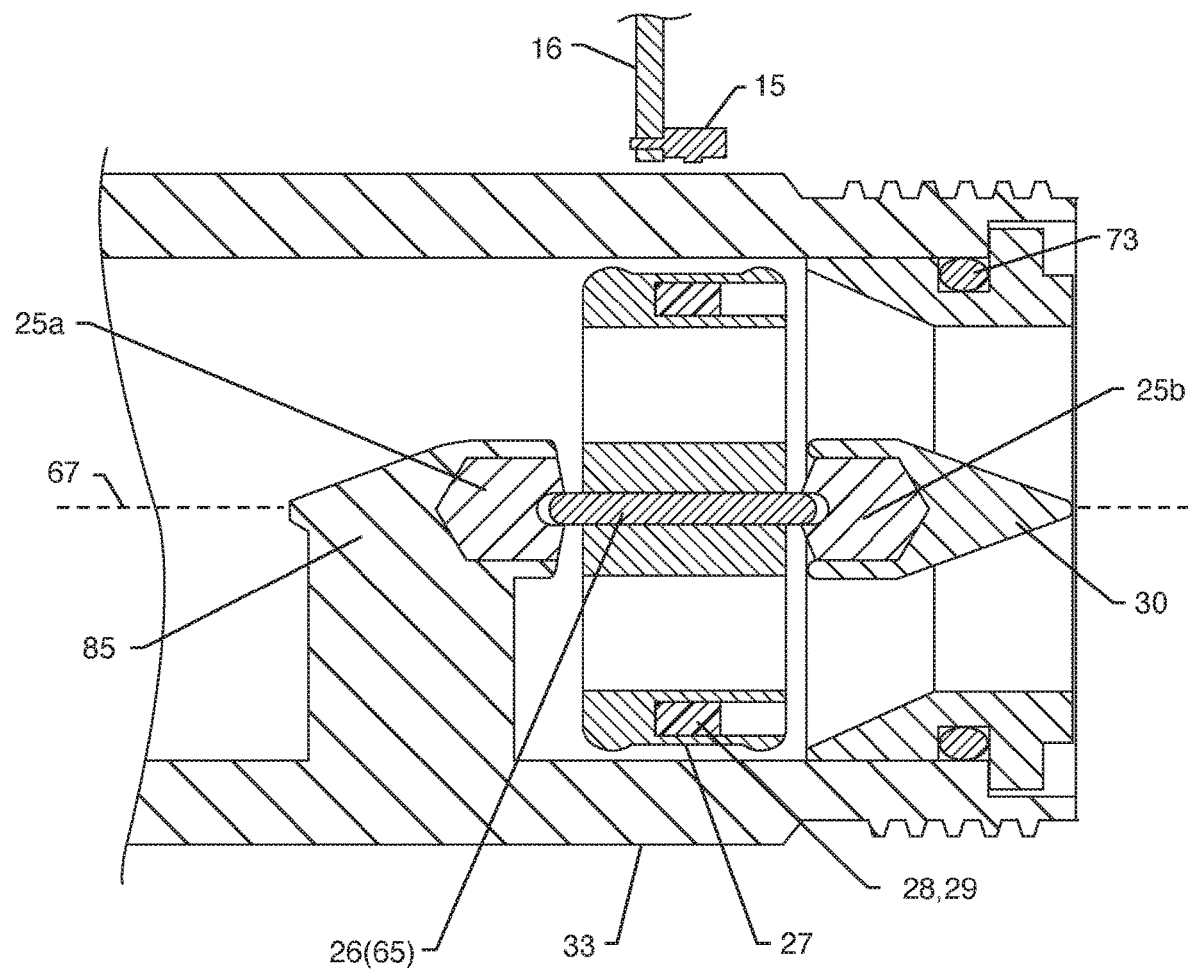
FIG. 1 is a sectional side view of a simplified fluid pipe portion having a freely rotatable turbine wheel disposed therein.
Figure 2:
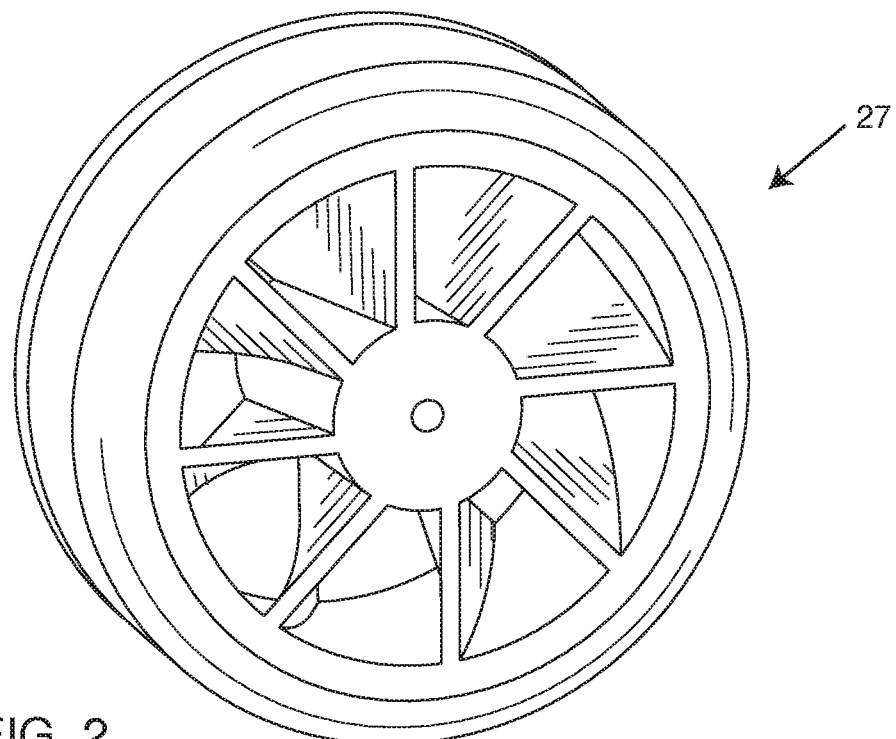
FIG. 2 is a front isometric view of the turbine wheel of FIG. 1.
Figure 3:
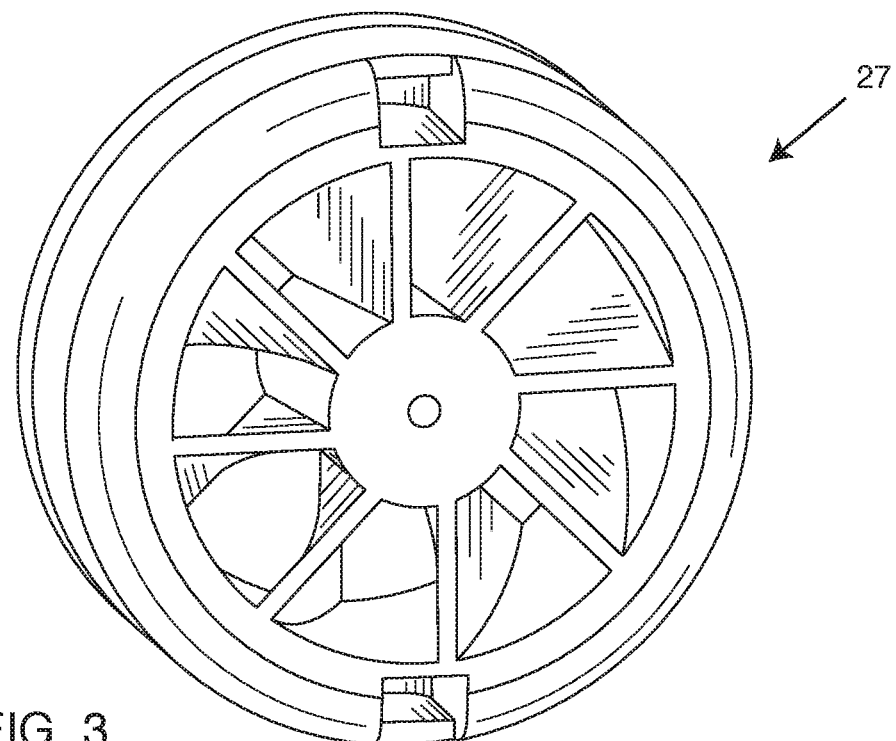
FIG. 3 is a rear isometric view of the turbine wheel of FIG. 1.

The improved turbine design of the present invention can be utilized with any device where there may be benefit to monitoring liquid flow, for example, leak detection shut off valves; plumbing devices, such as faucets, showerheads and silcocks; Internet of Things connected devices for identifying leaks, water consumption or other applications where water flow may provide useful data. As a particular example, the turbine design of the present invention can be used with the control devices previously taught in patent applications: Ser. No. 15/977,546 filed on May 11, 2018 (U.S. Publication 2018/0259982); Ser. No. 15/849,669 filed on Dec. 21, 2017 (U.S. Publication 2018/0136673); and Ser. No. 14/182,213 filed on Feb. 17, 2014 (U.S. Publication 2014/0230925 and now U.S. Pat. No. 9,857,805), wherein all the contents of these applications are fully incorporated herein with this reference.

This Detailed Description merely describes exemplary embodiments of the invention and is not intended to limit the scope of the claims in any way. Indeed, the invention as claimed is broader than and unlimited by the embodiments shown herein, and the terms used in the claims have their full ordinary meaning. For example, while exemplary embodiments described in this disclosure relate to use of a fluid usage monitoring system for measurement and control of water usage in a plumbing system, it is to be understood that one or more of the features described herein may additionally or alternatively be applied to other water system or to other fluid systems, such as, for example, natural gas, air, propane, steam, oil, gas, or other such fluid systems. Furthermore, it is understood that a fluid can be comprised of air, steam, gas, liquid or any combinations thereof.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value in the claims are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

"Computer," "controller," "control module," or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc. Computer devices herein can have any of various configurations, such as handheld computers (e.g., so-called smart phones), pad computers, tablet laptop computers, desktop computers, and other configurations, and including other form factors. The various computers and processors herein have logic for performing the various corresponding functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like. In exemplary embodiments, some or all of the software is stored on memory, which includes one or more non-transitory computer readable media of one or more local or remote data storage devices. As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., RAM, ROM, PROM, EPROM, EEPROM, flash PROM, external flash memory drives, etc. Communication circuits herein include antennas and/or data ports and driver chips for sending and receiving communications with other devices. In exemplary embodiment, communication circuits can include any one or more of Wi-Fi antennas and circuitry, LTE antennas and circuitry, GPS antennas and circuitry, CDPD antennas and circuitry, GPRS antennas and circuitry, GSM antennas and circuitry, UMTS antennas and circuitry, Ethernet circuitry, and other antennas and circuitry, USB ports and circuitry (e.g., standard, micro, mini, etc.), RS-232 ports and circuitry, proprietary ports and circuitry (e.g., APPLE 30 pin and Lightning ports), RFID antennas and circuitry, NFC antennas and circuitry, bump technology antennas and circuitry, a Bluetooth (e.g., BLE) antenna and circuitry, DOCSIS circuitry, ONT circuitry, and other antennas, ports, and circuitry.

As described herein, when one or more components are described as being connected, joined, affixed, coupled, attached, or otherwise interconnected, such interconnection may be direct as between the components or may be indirect such as through the use of one or more intermediary components. Also, as described herein, reference to a "member," "component," or "portion" shall not be limited to a single structural member, component, or element but can include an assembly of components, members or elements.

FIG. 1 is a sectional side view of a simplified fluid pipe portion 33 having a turbine wheel 27. The simplified fluid pipe portion 33 is very similar to the pipe portions taught in the '546, '669 and '213 applications but has been simplified herein. For consistency and ease of understanding, the numerals used in the present application will incorporate and follow those numerals used in the '669 and '213 applications.

Referring also to FIGS. 2-6, the turbine wheel 27 of one embodiment of the present invention has a hub 66 that includes at least one, usually many, vanes (blades) 68 that extend outwardly and are arranged concentrically and evenly spaced about the longitudinal axis 67 for a proper equal balancing. As shown in this embodiment there are eight vanes that extend outwardly, however, it is understood that a wide range of vanes may be used from 1 to any n number of vanes.

Multiple concentric vanes 68 with either helical or angled form cause separation of the primary pipeline flow field and redirection in a manner to cause rotation of turbine wheel 27. The vanes 68 are configured with minimal open space 74 for fluid field to pass directly through the rotor. The fluid impingement upon the faces of the vanes converts axial momentum to angular rotation of turbine wheel 27. The angle of attack of the flow vanes and quantity of vanes affects the rotational velocity. The flow channels bounded by the vanes are designed to provide near-equivalent flow area to the main pipeline in order to reduce head loss (pressure drop) through the turbine assembly.

Some of the embodiments shown herein may be a single-shot injection molded homogeneous component/part using an engineered resin. This then allows the use of a two-part mold that can easily separate during turbine wheel production and speeds cycle time of the molding process.

In one embodiment, the engineered resin may have a specific gravity at or below 1.0. To minimize load on bearings, achieving neutral buoyancy is advantageous. In certain water applications, using material with specific gravity between 0.9 and 1.0 can be advantageous to achieve neutral buoyancy to reduce load on bearings. The turbine material may be polypropylene homopolymer with specific gravity 0.903. A lower specific gravity (below a specific gravity of 1, i.e. water) of bulk turbine molding can compensate for weight of shafts and/or bearings.

As shown herein, the vanes 68 extend outwardly to a concentrically formed cylindrical rim 69. It is understood that a turbine wheel 27 could be made without a rim 69, where the vanes extend outwardly starting at root 70 and extend to a tip 71 without then attaching to any additional structure. However, having a rim 69 provides additional support for the vanes and prevents them from breaking off or incurring damage. Additionally, the rim 69 helps contain the fluid flow such that rotation of the turbine wheel 27 is improved.

As shown herein, the turbine wheel has two peripheral cavities or pockets 72 formed within the rim 69 intended to accept a magnet 28, an additional magnet or counter-weight 29, magnetically-permeable ferrous disc/parts 28 and 29 or the like. The pocket 72 is formed from the back side of the turbine wheel during the molding process. It is understood that the pocket 72 could have been formed from the front side of the turbine wheel or radially from the outside diameter of rim. Furthermore, the magnets 28 or counter-weights 29 can be placed inside the pocket 72 with an interference press fit or various adhesive and fasteners could have been used known to those skilled in the art. Those skilled in the art could use just one pocket, two pockets or any n number of pockets formed in the rim. However, it is a good practice to balance the weights such that smooth rotation of the turbine wheel is enabled. Accordingly, one skilled in the art could use one magnet, two magnets, one magnet and one weight, or any other possible combination of magnets and weights to meet the system being designed for.

In an exemplary embodiment, the turbine wheel 27 has a centrally disposed turbine shaft 26 that is placed through a central thru-hole 65 in the hub 66 of the turbine wheel. The hole and the turbine shaft are located along a longitudinal axis 67 of the turbine wheel, where the turbine wheel is able to rotate freely about this longitudinal axis. As shown here, the turbine wheel and the turbine shaft are two separately manufactured parts. The turbine shaft can be fixed in place within the hole of hub by interference press fitting, or using an adhesive, fastener or the like. However, it is also understood that the turbine wheel and turbine shaft could be manufactured as one integrally formed part, for example as in a plastic injection molding process.

As best seen in FIG. 1, there is a first/front turbine bearing 25a disposed at a front end of the turbine shaft and a second/rear turbine bearing 25b disposed at a rear end of the turbine shaft. These turbine bearings 25 are of a low-friction material allowing the shaft to freely spin therein. The bearings 25 may be made from PTFE-filled PPS, PEEK, Polyamide-imide, synthetic sapphire or ruby.

The front turbine bearing 25a is captured within a front bearing support 85. As shown and intended herein, the front bearing support 85 is integrally molded as part of the fluid pipe section 33. However, it is understood that the front bearing support could have been made a separately manufactured part. Furthermore, the front bearing support may have one, two, three or any n number of extensions that connect it to the fluid pipe section.

The rear bearing support 25b is captured within a rear bearing support 30. As shown and intended herein, the rear bearing support 30 is a separately manufactured part but could have been made as an integrally formed part of the fluid pipe section 33. The rear bearing support also has an optional seal 73 that helps keep the rear bearing support in place during manufacturing as well as adding additional sealing capabilities.

It is also understood that the bearings 25a and 25b could have been integrally formed as part of the supports 85 and 30. This would reduce part count and ease assembly. One point to consider is how this might affect material selection for low-friction rotation of the turbine wheel.

As shown in FIG. 1, a Hall Effect sensor 15 and a printed circuit board 16 are placed near the magnet/weight inside the turbine wheel and are utilized to sense the rotation of the turbine wheel due to movement of the magnet/weight. A Hall Effect sensor is a transducer that varies its output voltage in response to a magnetic field. Hall Effect sensors are commonly used to time the speed of wheels and shafts, such as for internal combustion engine ignition timing, tachometers and anti-lock braking systems. Herein, they are used to detect the position of the permanent magnet 28. In place of the Hall Effect sensor 15 a reed switch can also be used. It is understood by one skilled in the art that other sensors could be utilized to determine the flow rate of the fluid. Other sensors which may be used with different embodiments of the present invention include, for example, thermal mass flow sensors, ultrasonic flow sensors, magnetic sensors, Coriolos sensors or vortex shedding flow meters and the like.

Figure 4:
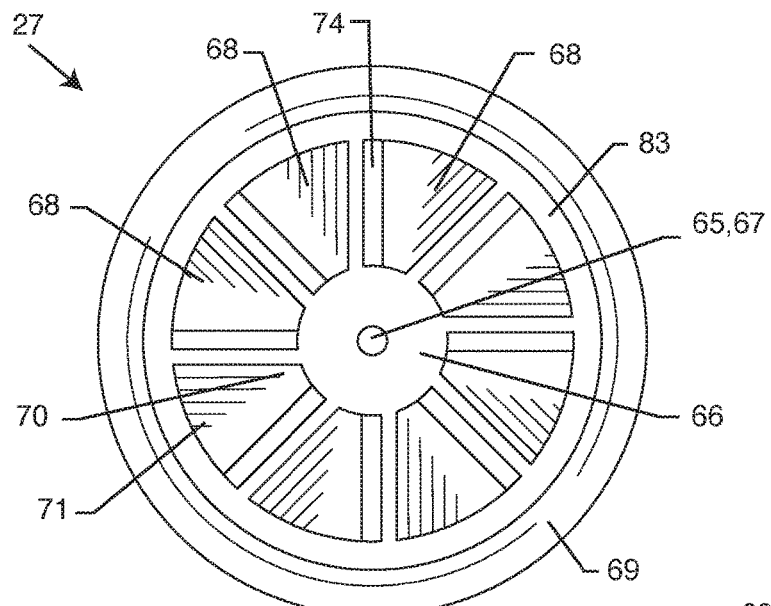
FIG. 4 is front view of the turbine wheel of FIG. 1.
Figure 5:
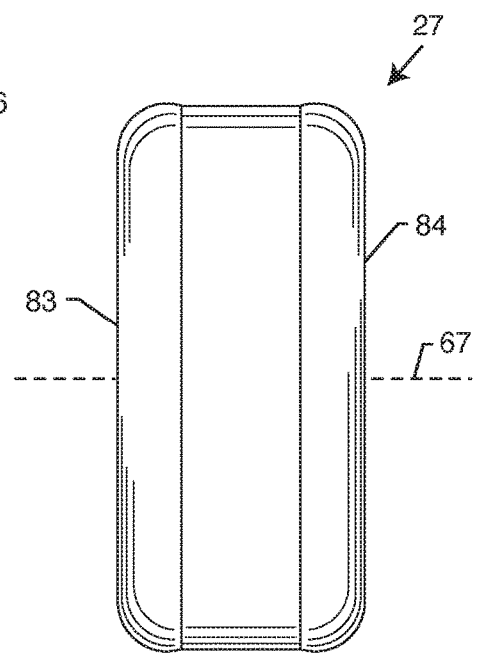
FIG. 5 is a side view of the turbine wheel of FIG. 1.
Figure 6:
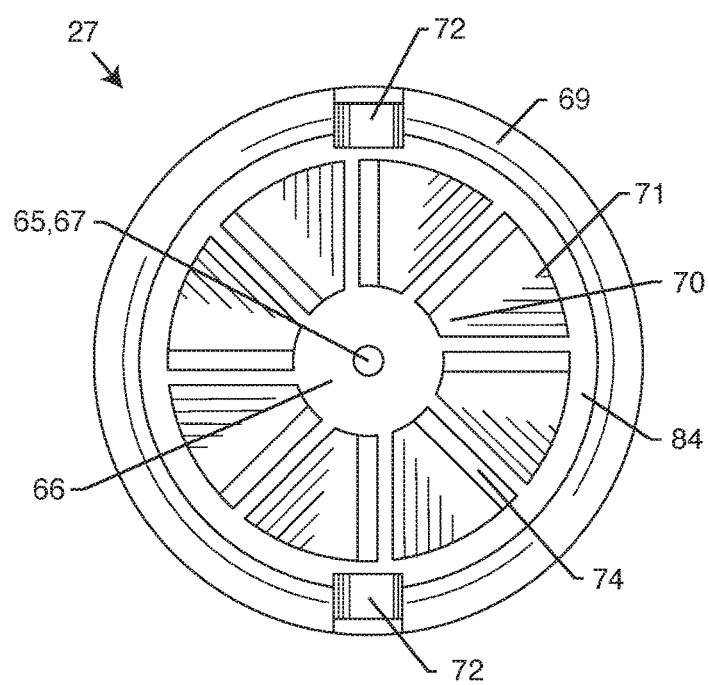
FIG. 6 is a rear view of the turbine wheel of FIG. 1.

It is also worth noting when looking at FIGS. 4 and 6 that one can see straight through the turbine rotor at a multitude (eight as shown herein) of pass through areas 74. These pass through areas 74 are locations where a fluid can pass directly through the turbine wheel without imparting rotational movement to the turbine wheel. Therefore, to increase the low flow sensitivity of the flow meter to the desired sensitivity, one skilled in the art can minimize the size and spacing of these pass through areas 74 to meets the desired sensitivity.

It is understood that the turbine wheel of the present invention is to be used for fluids. Fluids can comprise liquids, gasses or combinations thereof. As used herein, the flow meter of the present invention may be used on the plumbing system of a building or residence that is transporting water for use, such as showers, toilets, faucets and the like.

Low flow sensitivity defines the minimum flow rate that a flow meter can measure repeatably with reasonable accuracy. The minimum flow threshold of all flowmeters increase as pipe diameter increases. This is due, for example, to lower net axial velocity and distribution of flow energy to larger effective area. The enhancements described in some of the embodiments described hereinafter have achieved low flow sensitivity in the range of 0.5% of maximum flow rate, which is an order of magnitude lower than industry standard of 5%.

One teaching of the present application is that as one decreases the pass through area 74 and/or while also reducing the vane count, improvements in low flow sensitivity can be achieved. When a volume of water equivalent to the open volume within the rotor passes through the meter, the rotor will rotate 360/n degrees, where n is number of vanes. Thusly, rotational velocity will increase as vane count is reduced. Increasing rotational velocity improves metering accuracy with appropriate design of the turbine wheel and flow channels.

Figure 7:
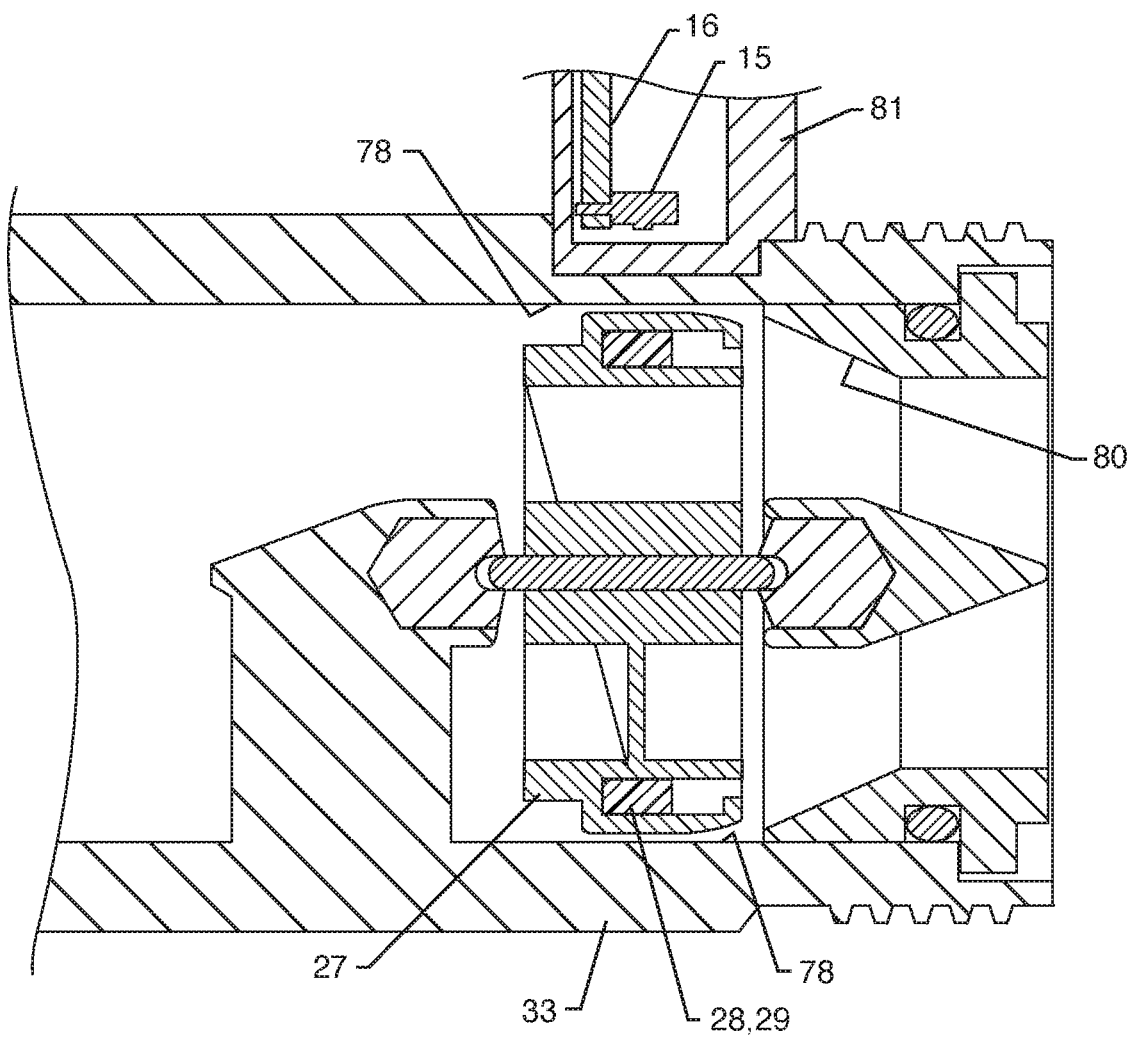
FIG. 7 is a side sectional view similar to FIG. 1 now showing a different embodiment of a turbine wheel inside of a fluid pipe section.
Figure 8:
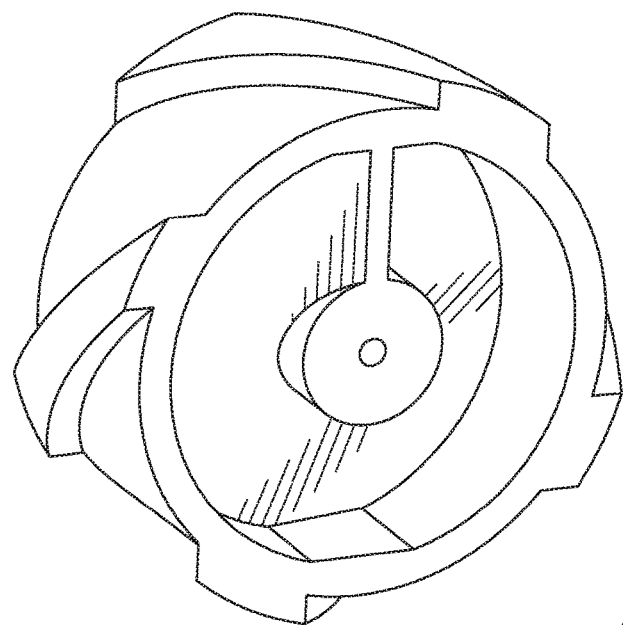
FIG. 8 is a front isometric view of the turbine wheel of FIG. 7.
Figure 9:
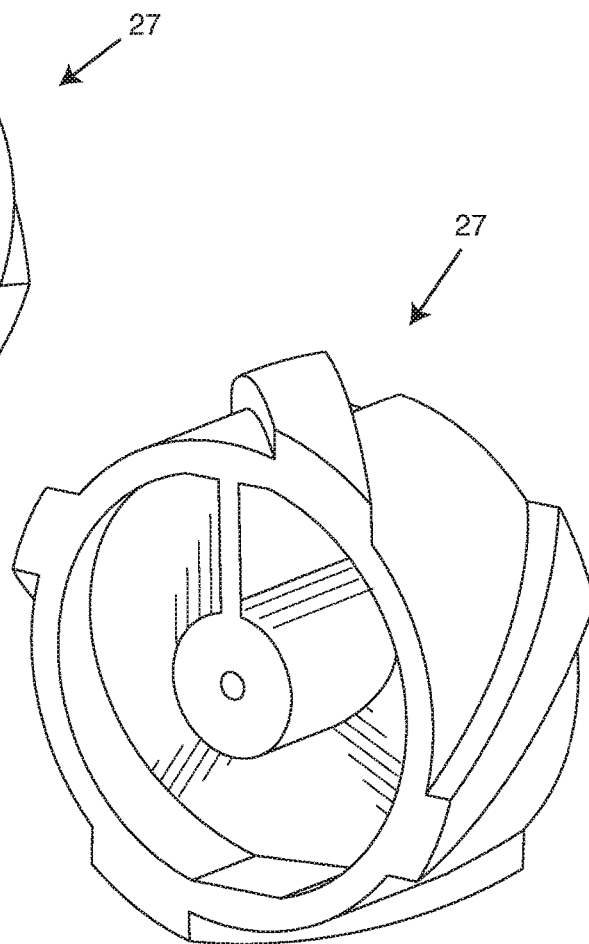
FIG. 9 is another front isometric view of the turbine wheel of FIG. 7 taken at a different angle.
Figure 10:
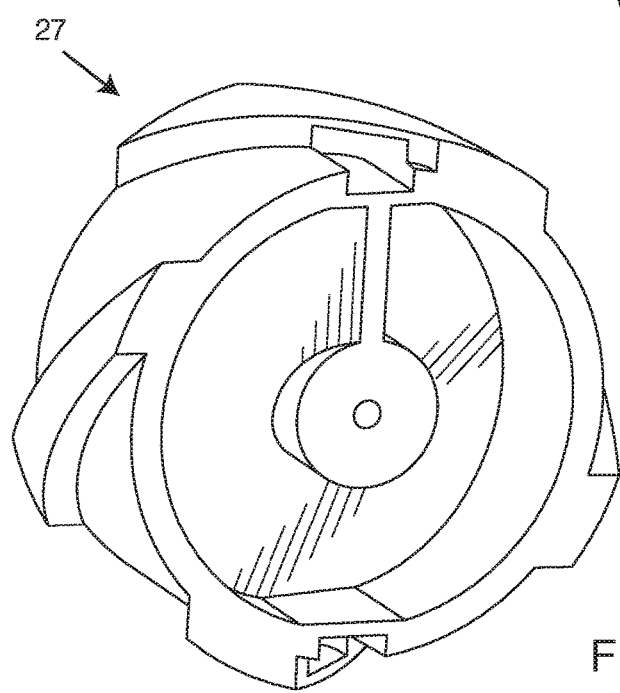
FIG. 10 is a rear isometric view of the turbine wheel of FIG. 7.
Figure 11:
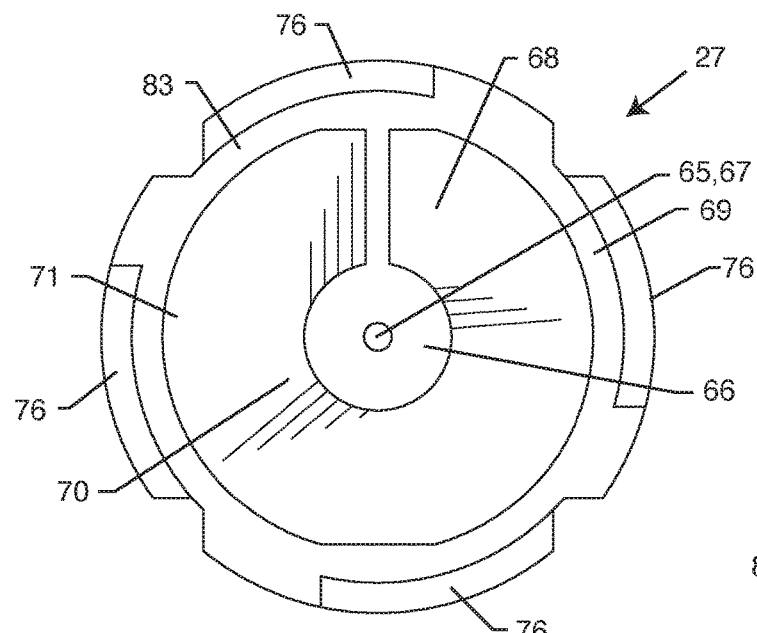
FIG. 11 is front view of the turbine wheel of FIG. 7.
Figure 12:
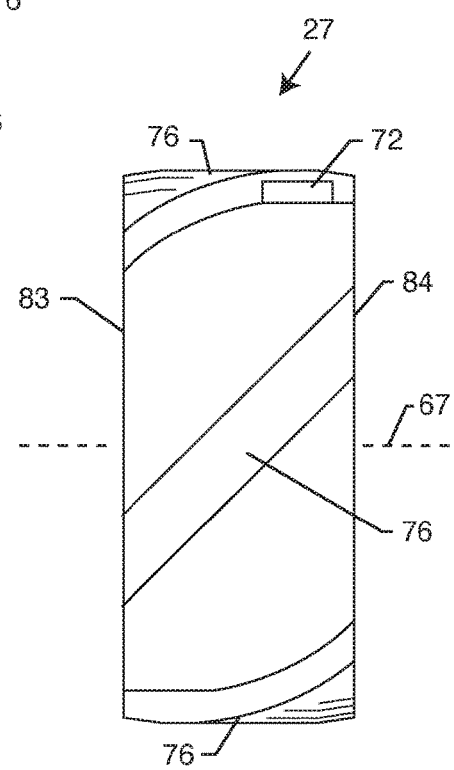
FIG. 12 is a side view of the turbine wheel of FIG. 7.
Figure 13:
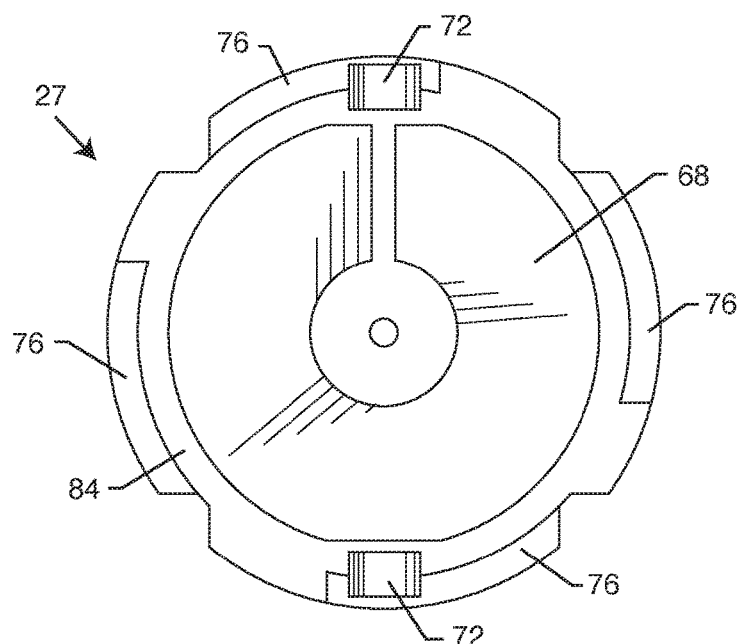
FIG. 13 is a rear view of the turbine wheel of FIG. 7.

FIG. 7 is a side sectional view similar to FIG. 1 now showing a different embodiment of a turbine wheel 27 inside of a fluid pipe section. The turbine wheel of FIG. 7 is best understood when looking at FIGS. 8-13. As depicted, the turbine wheel 27 has just one vane 68. The single vane 68 extends 360 degrees around the hub 66 starting from the front face 83 of the turbine wheel and ends at the rear face 84 of the turbine wheel. The root 70 of the vane 68 is continuously attached to the hub 66, while the tip 71 of the vane 68 is continuously attached to the rim 69. As can be seen in FIGS. 11 and 13 there is no pass through area 74.

Another novel aspect of this turbine wheel is its ability to reduce fouling. Buildup or particulates/debris on the outside diameter of the rim 69 can result in reduction of turbine meter accuracy or can stall the turbine wheel completely. To reduce potential for fouling, the current embodiments include external vanes 76 disposed outside of the flow cylinder rim 68. As shown here, there are four external vanes 76, however, it is understood that any n number of external vanes 76 could have been used.

Furthermore, the vanes 76 can be in an angular or helical configuration. When the turbine wheel rotates due to primary vane 68 reaction forces, the outer vanes 76 generate a flow field on the periphery between turbine wheel and the inside diameter 78 of the meter housing (i.e. the inside of the fluid pipe section). The external vanes 76 either through the currents generated or from physical contact brush away any particulates that may have a tendency to stick and thus provide an improved anti-fouling function.

Optionally, as shown here, the outlet channel, which is part of the rear bearing housing 30, has a tapered transition 80 to allow the external flow field to recombine with main fluid field to reduce eddy losses. Again, the induced flow field flushes particulates or debris that could normally accumulate and cause fouling.

Referring back to FIG. 7, a housing 81 contains the sensor 15 and the printed circuit board 16. The housing is configured to nest further within the thickness of the fluid pipe section 33 such that the sensor 15 is as close to the magnets 28 as practically possible for improved sensing.

Figure 14:
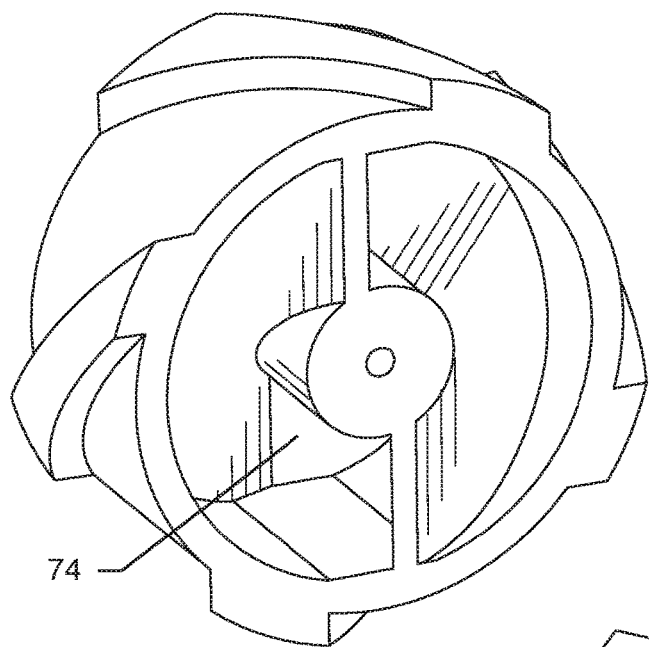
FIG. 14 is a front isometric view of another embodiment of a turbine wheel of the present invention.
Figure 15:
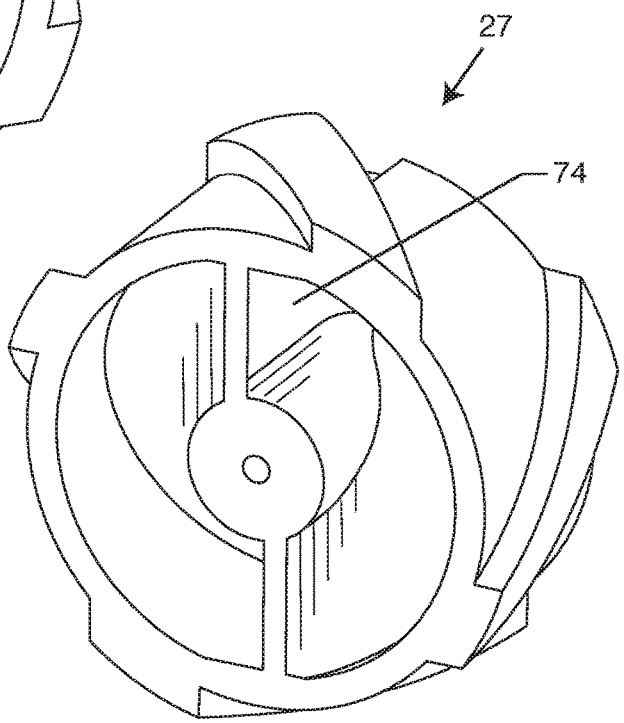
FIG. 15 is another front isometric view of the turbine wheel of FIG. 14 taken at a different angle.
Figure 16:
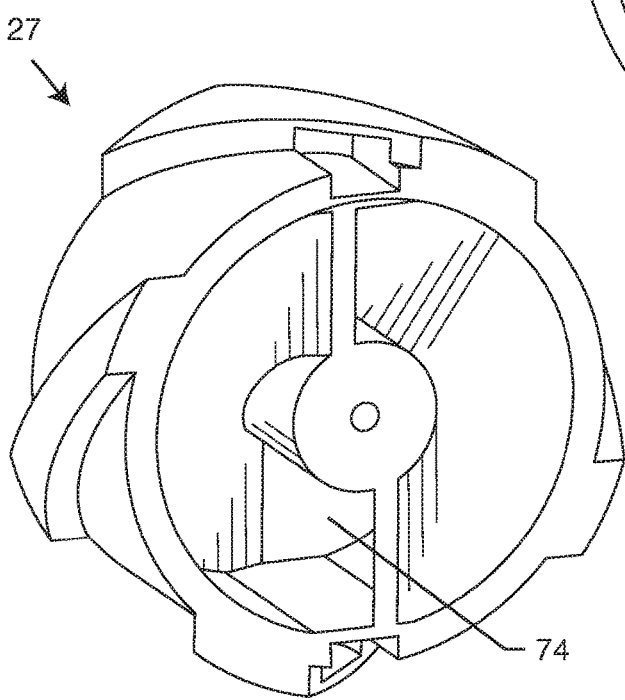
FIG. 16 is a rear isometric view of the turbine wheel of FIG. 14.
Figure 17:
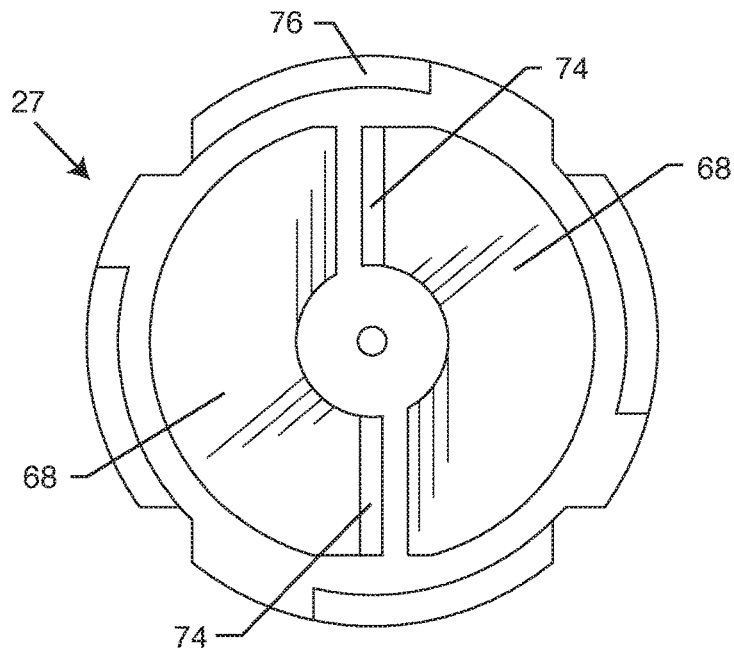
FIG. 17 is front view of the turbine wheel of FIG. 14.
Figure 18:
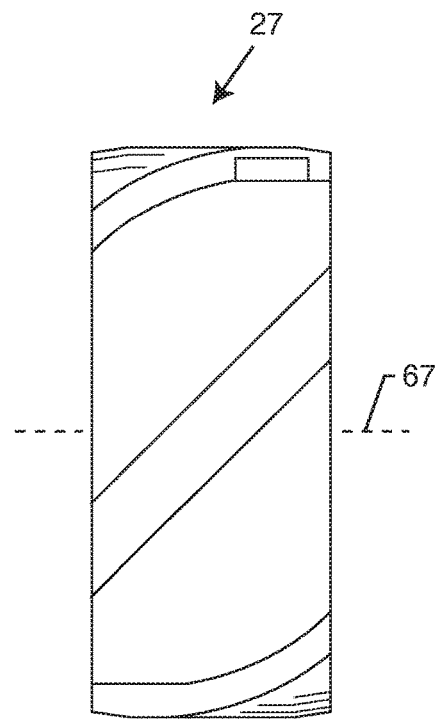
FIG. 18 is a side view of the turbine wheel of FIG. 14.
Figure 19:
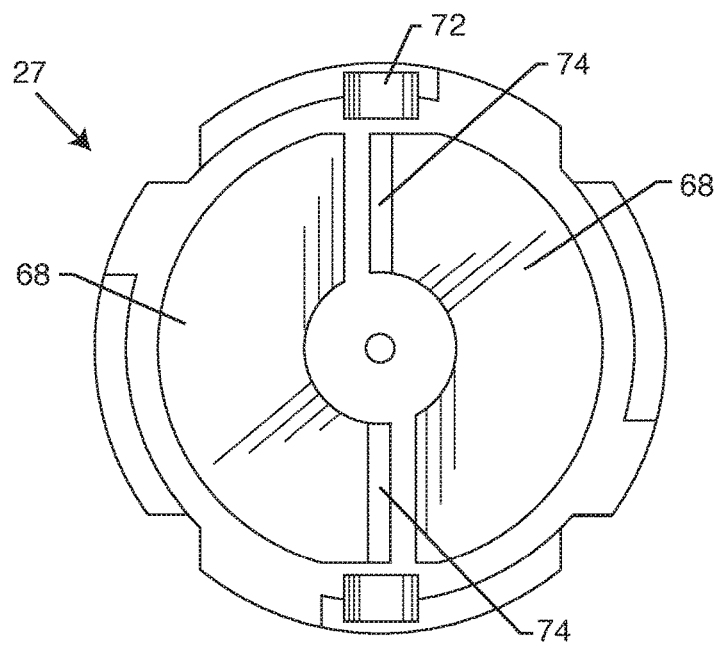
FIG. 19 is a rear view of the turbine wheel of FIG. 14.
Figure 20:
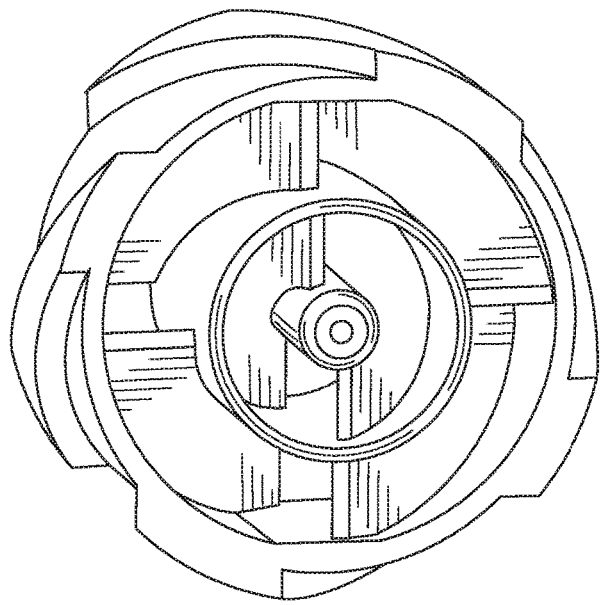
FIG. 20 is a front isometric view of another embodiment of a turbine wheel of the present invention.
Figure 21:
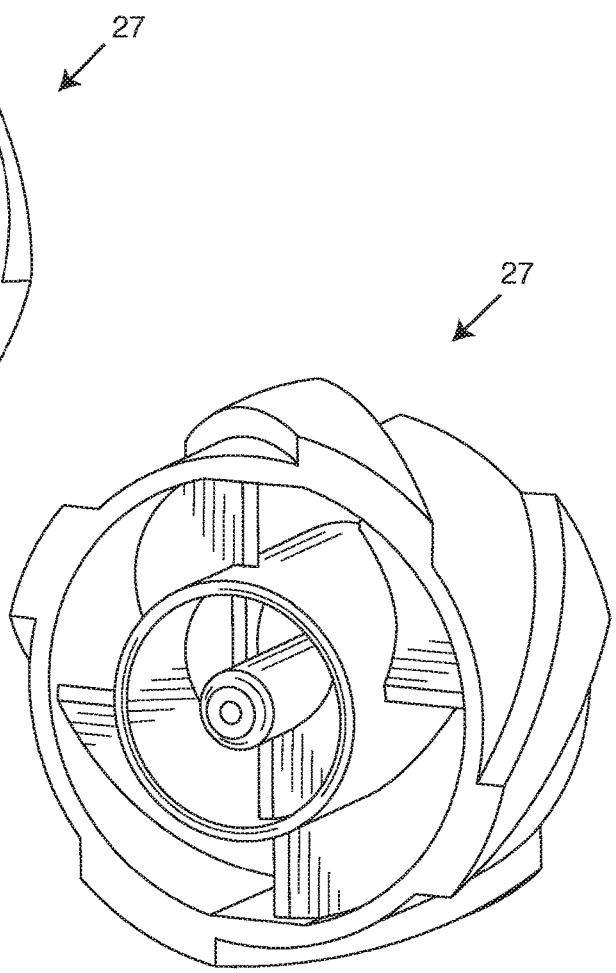
FIG. 21 is another front isometric view of the turbine wheel of FIG. 20 taken at a different angle.
Figure 22:
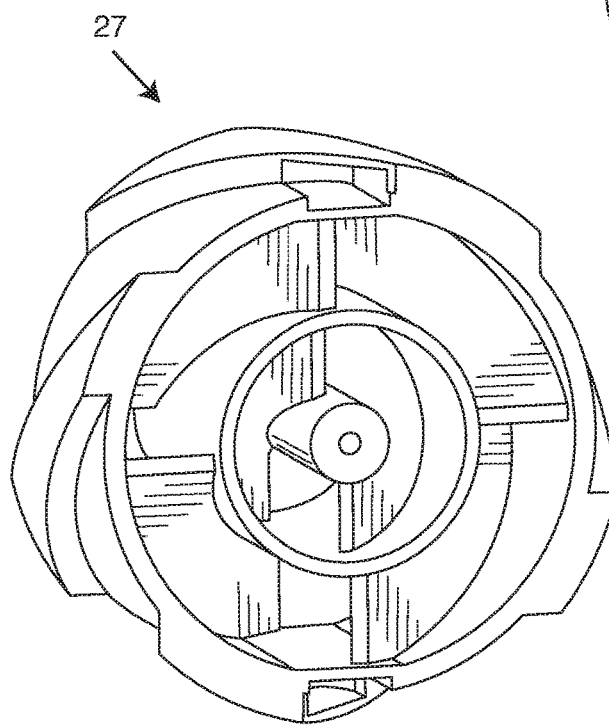
FIG. 22 is a rear isometric view of the turbine wheel of FIG. 20.

While low flow sensitivity is enhanced with the single vane embodiment, other variations are still possible. For example, FIG. 14 is a front isometric view of another embodiment of a turbine wheel of the present invention that still has a great improvements over prior art designs, but may be more practical to manufacture. FIGS. 15-19 are other views showing this new embodiment of FIG. 14. In this embodiments, there are now two vanes 68 and just two small pass through areas 74. This design is easy to manufacture in a simple two part molding operation while also has improved low flow sensitivity.

FIGS. 20-25 show another embodiment of the present invention. To improve low flow sensitivity in larger pipe diameters, the embodiments of FIGS. 20-25 have been developed with two sets of concentric vanes. Here, there is a first set of vanes 68a that extend from the hub 66 to the first cylindrical rim 69a. Then, a second set of vanes 68b extend from the first cylindrical rim 69a to a second cylindrical rim 69b. The second cylindrical rim 69b is concentric with and disposed outside of the first cylindrical rim 69*a*. This embodiment also includes the outer external vanes 76 to reducing fouling.

As can be seen, this turbine wheel is designed with two concentric flow cylinders 69*a* and 69*b*, each with separate flow vanes disposed within. At low flow velocities the primary flow field will be laminar, with most energy at the center of the pipe. Therefore, the central flow cylinder 69*a* constrains this central higher energy flow volume to impinge upon a controlled, low vane count interior section. The bounding cylinder 69*a* also constrains radial shedding of energy as flow volume impinges on vanes 68*a*. The secondary group of vanes 68*b* is bounded by the outer flow cylinder 69*b* and is configured for optimal balance of flow response for a desired metering range.

As shown in this embodiment, there are two inner vanes 68*a* and four outer vanes 68*b*. It is noted that the inner vane count (2) in this and other embodiments may be less than the outer vane count (4). For example, the inner vane count could be just 1 whereas the outer vane count could be 2. Alternatively, the inner vane count could be 2 whereas the outer vane count could be 3.

It is also possible the inner vane count and outer vane count be equal at 1, 2, 3, 4 or any n number of vane counts.

It is also noted that when looking at FIG. 24, one can best see that the leading edge 87*a* of the first cylindrical rim 69*a* extends a distance 86 ahead of the leading edge 87*b* of the second cylindrical rim 69*b*. Also, as shown herein, the trailing edge 88 of both rims (i.e. 88*a* and 88*b*) are aligned. These features may enhance the performance at transitional flows in an attempt to sustain a linear frequency versus flow rate character for purposes of meter calibration accuracy.

It is noted that the vanes shown and taught herein are of a practical helical form with a wall section reasonably uniform. As currently shown, the vanes are generally angled at 45 degrees which may be one embodiment for an optimal balance that transfers the axial flow field forces to cause radial component loading to efficiently cause rotation. Testing steeper (i.e. flatter) angled vanes found no improvement or loss of low flow threshold, however the pressure drop may be higher. On the other hand, shallower angled vanes may reduce the low flow threshold. Accordingly, as is known by those skilled in the art, other angles and shapes may also work in the present invention as this teaching is not limited to the precise form of the vanes shown and taught herein.

Figure 26:
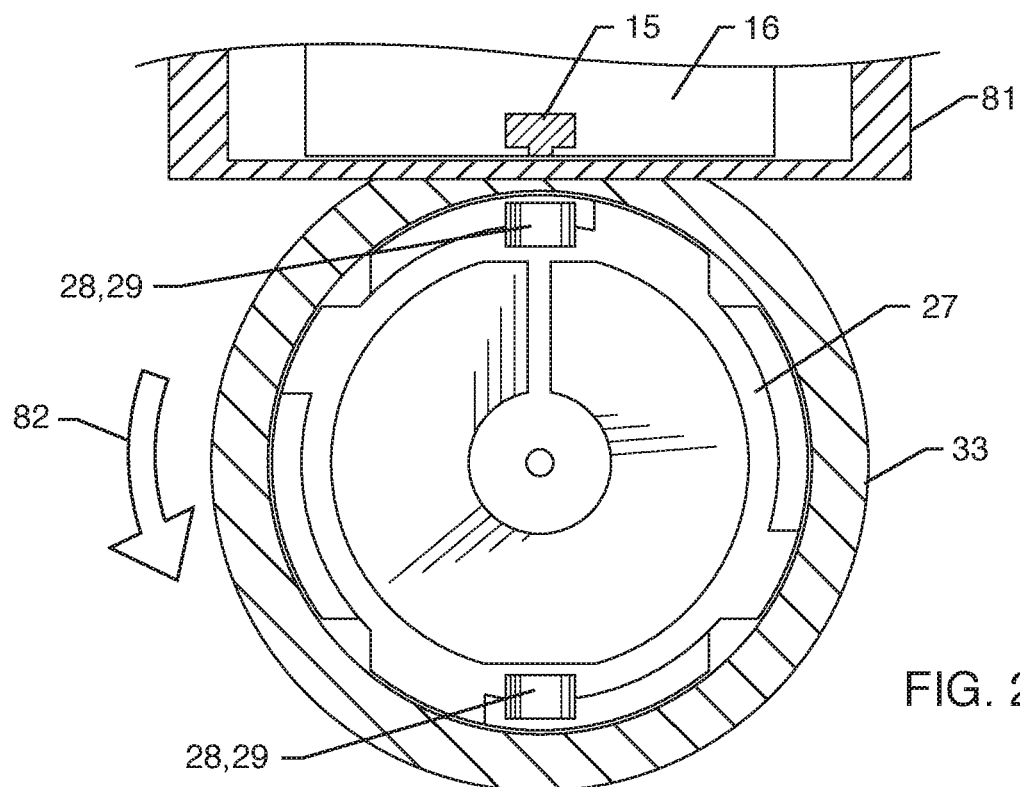
FIG. 26 is a sectional view along the fluid pipe section showing how the magnet within the turbine wheel can pass by the sensor.

Turning now to FIG. 26, which is a sectional view looking along the longitudinal axis 67, a flow meter may utilize a singular sensing element 15 to capture a signal when an individual vane or magnet 28 passes. An electronic circuit converts this pulse signal to a frequency. Flow meters are calibrated based on frequency versus flow rate. In a conventional configuration, a flow meter will see the same signal response, irrespective of turbine wheel rotation direction. As shown in FIG. 26 we can see the back surface of the turbine wheel and that the turbine wheel will rotate in a direction 82 that is counter-clockwise.

In order to meter and identify flow direction, some embodiments of the present invention show teach locating two magnetic sensing sensors 15*a* and 15*b* positioned such that the included angle from central axis 67 of the turbine wheel to center of each sensor is other than 180 degrees. For example, as shown herein, the angle is less than 30 degrees. Each sensor independently creates a response signal that is measured in the same time domain. By comparing a signal transient (i.e. rise and fall) of the actual timing a determination can be made relative to turbine wheel rotation direction.

Furthermore, at very low flow rates the relative timing between sensors 15*a* and 15*b* can be employed to measure rotational speed to much greater precision as compared to waiting for next full sweep of a magnet or vane.

Additionally, another enhancement realized from this configuration is that the secondary sensor 15*b* can provide signal redundancy when compared to the first sensor 15*a* for improvement in metering accuracy or to determine whether one of the sensors is malfunctioning.

Figure 27:
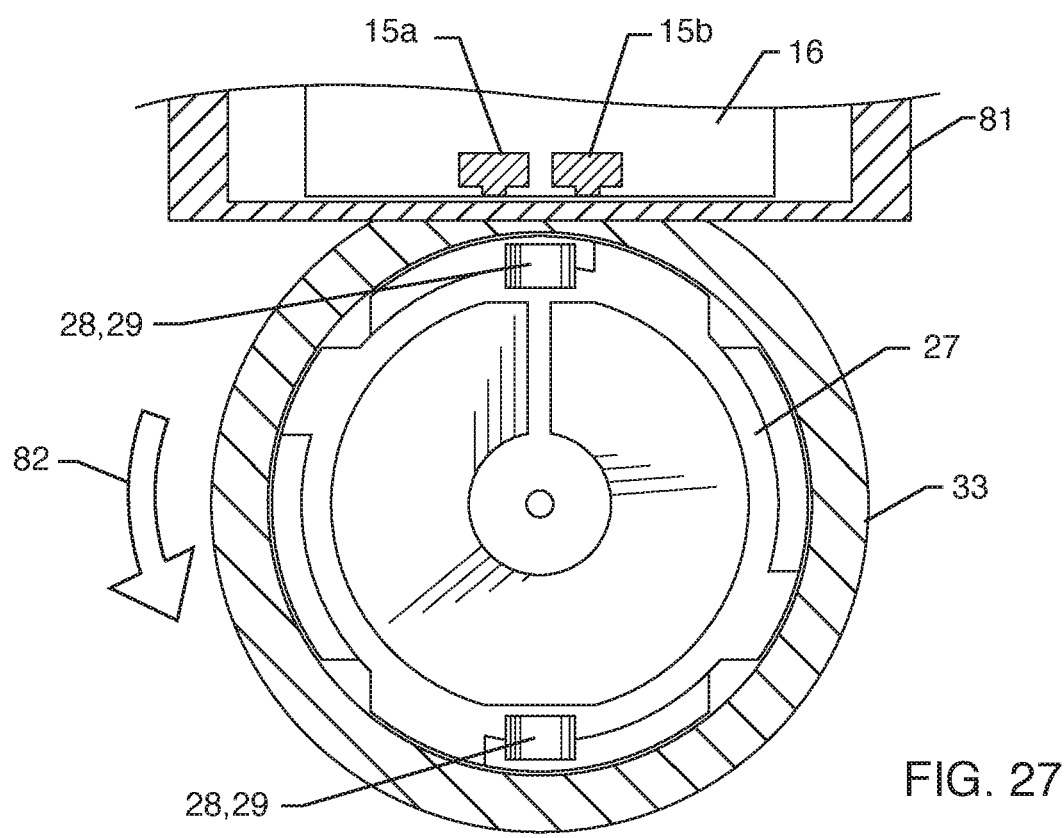
FIG. 27 is a sectional view similar to FIG. 26, now showing two sensors placed side by side for determining turbine wheel rotation direction.
Figure 28:
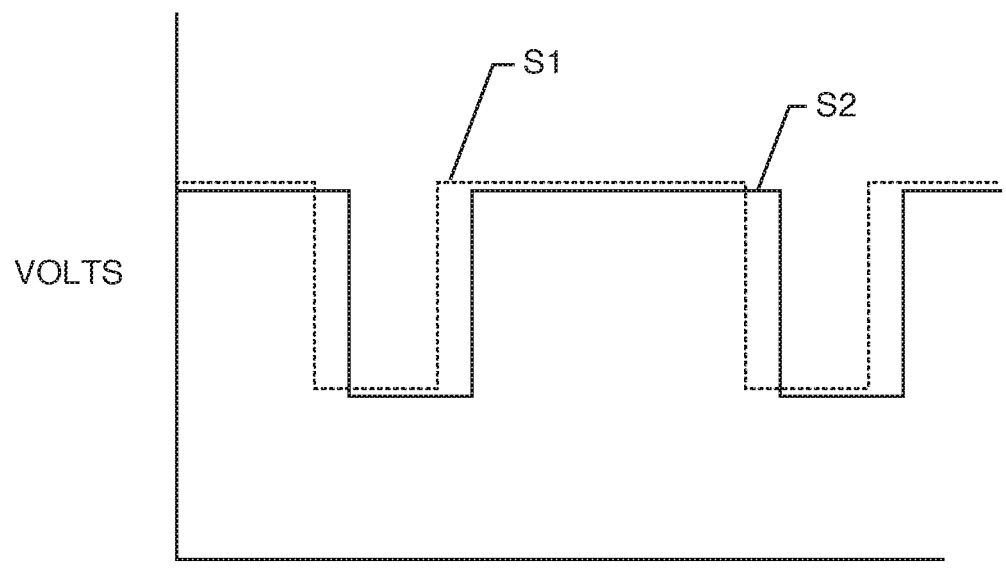
FIG. 28 is a sample reading taken from the structure of FIG. 26 showing one rotation direction.
Figure 29:
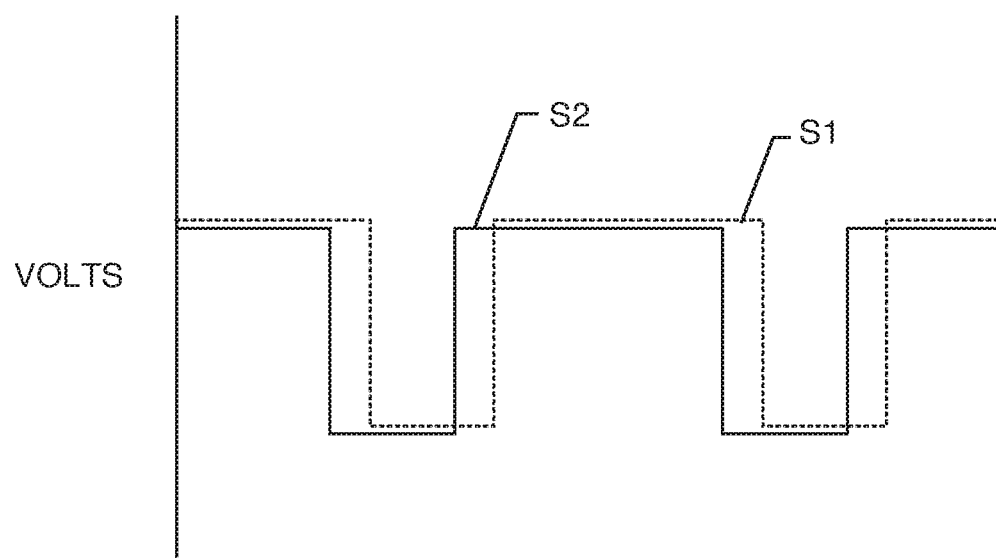
FIG. 29 is a sample reading taken from the structure of FIG. 27 showing a different rotation direction in comparison to FIG. 28.

FIGS. 28 and 29 show the electrical signals from two separate Hall Effect sensors (i.e. switches) taken from the structure of FIG. 27. In these plots the vertical axis measures the voltage and the horizontal axis measures the time domain. FIG. 28 shows forward flow case with timing of the S1 signal rise and fall preceding that of the S2 signal rise and fall. Timing of the signals are controlled by the passing of magnetic field through each hall sensor 15*a* and 15*b*.

Likewise, when flow is reversed as is shown in FIG. 29, the S1 signal change occurs later than S2 signal change. By comparative timing of voltage changes between two signals S1 and S2 the direction of rotation is established.

Furthermore, quantitative difference in timing will be proportional to rate of flow to permit determination of rotational frequency to calculate flow rate.

Figure 30:
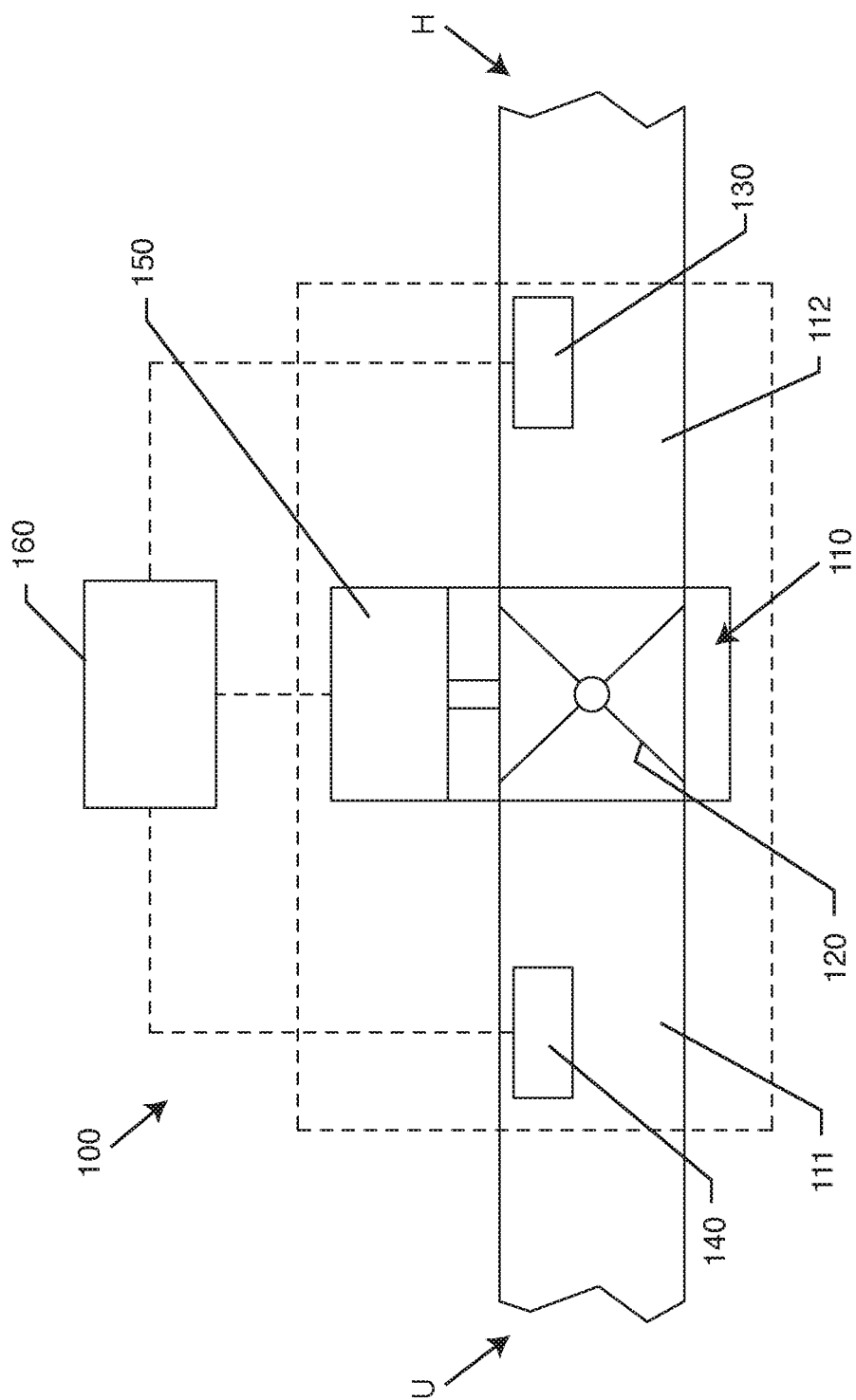
FIG. 30 schematically illustrates an exemplary monitoring and control system.
Figure 31:
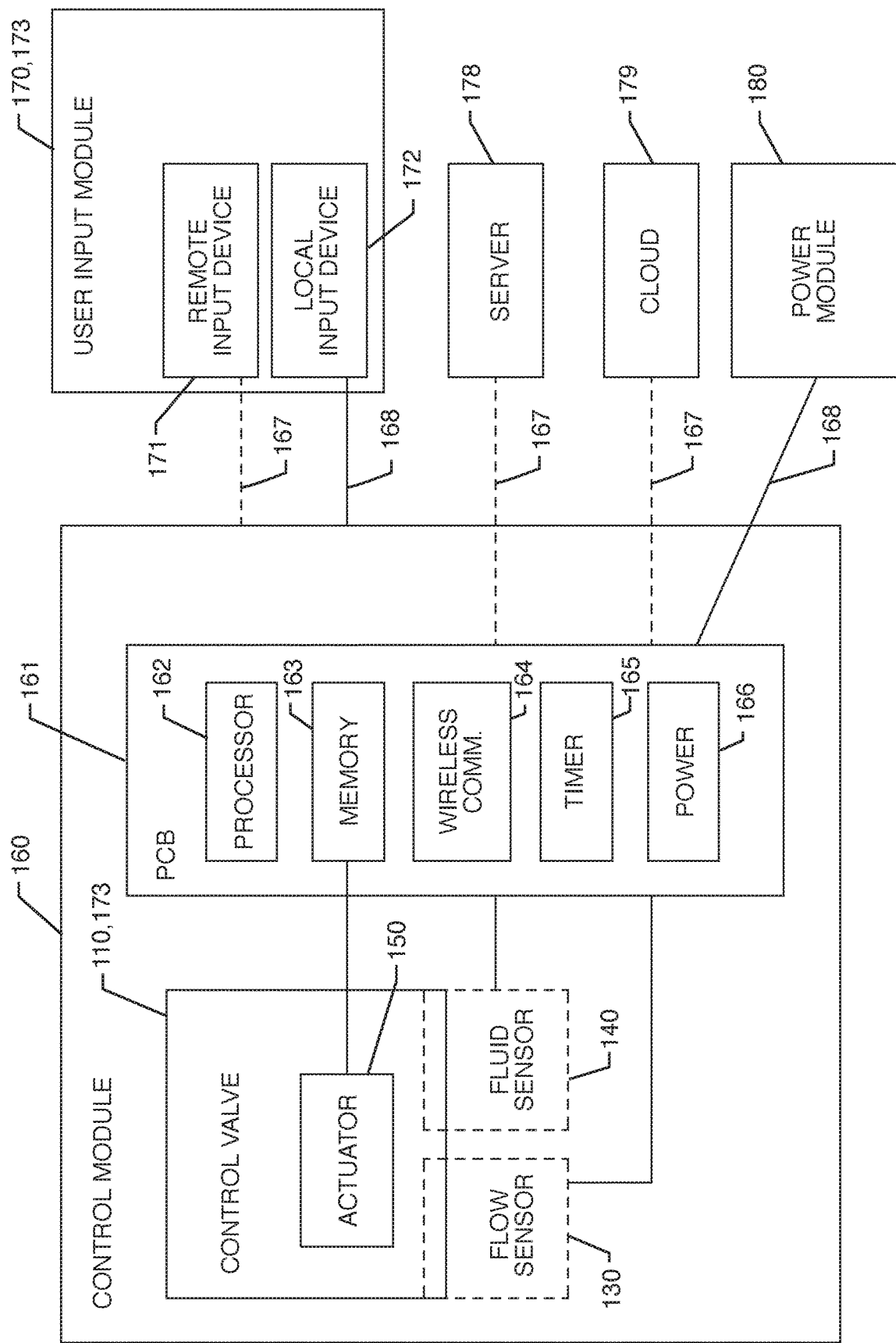
FIG. 31 schematically illustrates an exemplary controller of the present invention, which may include a number of electronic components.

Referring now to FIGS. 30 and 31, it is understood that the novel turbine wheels of the present invention can be used for flow meters or can be used for other flow devices used in a wide variety of ways as understood by those skilled in the art. For example, the turbine wheel of the present invention can also be used in shut off valve flow devices previously taught in application Ser. No. 16/829,339 filed on Mar. 25, 2020, the entire contents of which are fully incorporated herein with this reference.

FIG. 30 schematically illustrates an exemplary monitoring and control system 100 which also includes a control valve 110 having an inlet port 111 connected with a water source U (utility or supply side) and an outlet port 112 connected with a local plumbing system H (home or plant side), with a flow sensor 130. The flow sensor 130 can utilize the turbine wheels of the present invention and their associated structures.

Referring to FIG. 30, the flow sensor 130 may be disposed upstream of the valve element 120 (such as in position 140) or be disposed downstream of the valve element 120 as shown herein. Furthermore, the flow sensor 130 can include more than one, such that multiple flow sensors 130 are used at various locations along the control system 100.

The control valve 110 may include an electronically operated actuator 150 operable to open, close, or otherwise regulate a valve element 120 within the valve. This may be performed, for example, in response to indications from the sensors 130, 140 or a command from the user input module 170 (FIG. 31).

A control module 160 is operatively connected (e.g., by wired or wireless electronic communication) with the flow sensor 130 to receive and process fluid flow data, and with the actuator 150 to provide actuating signals for operation of the actuator to adjust the valve element 120 to a selected flow position, between closed and fully open, for example, in response to user input or in response to sensed fluid flow data from the flow sensor 130. In addition to the flow sensor 130, the system 100 may include other sensors 140, such as, for example, pressure sensors, temperature sensors, vibration sensors, and moisture sensors or the thermal mass flow sensor previously taught in the '339 application. Sensors 140 may be separately disposed from sensor 130 either on the same side or opposite side of the valve element, or sensors 140 may be integrally formed as part of and/or disposed with sensor 130.

Those of skill in the art will recognize that, in other embodiments, the flow sensor 130 can be positioned anywhere in the water system, for example closer to a point of use such as near the inlet of a plumbing fixture, for example, a toilet, a sink, a tub, a silcock or a faucet and the like. In these embodiments, there may be a local electronically controlled shut off valve (not shown) for the specific plumbing fixture. The local electronically controlled shut of valve may likewise include a control valve, an electronically controlled actuator, and a control module operably connected to the local flow sensor.

Although a control valve 110 and associated components (e.g., valve element 120, control module 160) are shown herein, those of skill in the art will recognize that in yet other embodiments there may not be a control valve 110 and associated components; instead, the flow sensor 130 may be operably connected to a transceiver (not shown) for communication with other devices such as, for example, a user input module 170, as described herein. In these other embodiments, the flow sensor 130 can be positioned at the main water inlet or anywhere in the water system, or may be positioned closer to a point of use such as near the inlet of a plumbing fixture, for example, a toilet, a sink, a tub, a silcock or a faucet and the like. Further, one or more flow sensors 130 and 140 may be used in conjunction with one another in a system to determine water usage and leaks within the system.

In an exemplary embodiment, as schematically shown in FIG. 31, the controller 160 may include a number of electronic components. These components enable the operation of the control valve 110 and the monitoring of the local fluid system. More specifically, these components enable the activation, deactivation, and control of the valve 110. The controller 160 may be integrated with the control valve 110, assembled with the control valve, or remotely connected with the control valve (e.g., using wired or wireless communication). The controller 160 may include one or more printed circuit boards ("PCBs") 161. In the illustrated example, a number of electronic components are mounted on the PCB 161, including, but not limited to, a processor 162, memory 163, a wireless communication chip 164, a timer 165, and a power port 166. The processor 162 receives signals from and sends signals to the electronically operated actuator 150 to control operation of the valve 110. For example, the processor 162 receives signals from the flow sensor 130 and any other flow/fluid sensors 140 and sends signals to the electronically operated actuator 150 to activate, deactivate, and control the valve 110. The timer 165 measures time intervals and instances for these actions, for example, for storage or communication with corresponding measured parameters (e.g., flow rate, pressure, temperature, etc.) or other actions.

The memory 163 can save information received from the sensors 130, 140 and the actuator 150. The information can also be saved in remote memory. Exemplary storage locations for the remote memory include a user input module 170 (e.g., a smartphone, tablet, or computer), a centralized server provided by the valve/control module manufacturer or other service provider, and/or a cloud service provided by the valve/control module manufacturer or a third party provider (such as Google®, HomeKit®, and IFTTT®). In the illustrated example, examples of the remote memory includes a server 178 and a cloud computing network 179. This fluid data information may be presented to a user in a variety of formats and using a variety of platforms (e.g., text message, software or web-based application) to present information regarding fluid usage, potential leaks, and other fluid system conditions.

In the illustrated example, the user input module 170 may provide operational instructions to the control module 160. The user input module 170 can be any module that enables user input. The user input module 170 may include one or more remote input device(s) 171 and manual input device(s) 172. Exemplary electronic input devices 171 include activation sensors, mobile devices, voice controlled devices, and touch screen devices, such as, for example, a smart phone, smart speaker, computer, or tablet. Exemplary manual input devices 172 include buttons, touchpads, and toggle switches connected with the valve 110 and/or control module 160. The user input module 170 receives input from a user and sends signals to the control module 160 to control operation of the valve 110. For example, the user input module 170 receives input from a user and sends signals to the processor 162 to activate, deactivate, and control the valve 110. In the illustrated embodiments, some components of the user input module 170 (e.g., a mobile device or voice controlled device) are connected to the control module 160 via a wireless communication connection 167 (such as a Wi-Fi connection with wireless communication chip 164) for wireless signal transmission, while other components of the user input module 170 (e.g., the local input device) are connected to the control module 160 via a hard-wired connection 168 for wired signal transmission. In other arrangements, each component of the user input module 170 could be connected to the control module 160 and send signals to and/or receive signals from the processor 162 via any type of connection, including other wireless communication connections, such as Bluetooth, cellular, near field communication (NFC), Zigbee, and Z-Wave, or a hard-wired connection. The user input module 170 could include any number of components. Moreover, each component of the user input module 170 could be in any location where it can send signals to and/or receive signals from the control module 160 and/or other electronic components of the proportional control valve 110, such as the processor 162, or each component of the user input module 170 could be integrally formed with or physically connected to the valve 110 and/or control module 160. Alternately, in cases where there is no control module 160, signals may be sent and received between a transceiver (not shown) operably connected to one or more sensors 140, 130.

In the illustrated embodiment, a power module 180 provides power to the electrical/electronic components of the control module 160. The power module 180 may be connected to the power port 166 of the control module 60 via a hard-wired connection 168. The power module 180 may include a variety of power sources, including, for example, AC power, battery power, or AC power with a battery backup.

During user operation of the electronic valve 110, the user may activate, deactivate, and/or control the electronic valve 110 using one or more components of the user input module 170. For example, the user could operate the user input module 170 by triggering an activation sensor/switch 173 on the valve 110 or control module 160, pressing an appropriate button or touchscreen prompt on the device 171/172, and/or vocalizing specific commands (e.g., device programmed voice prompts, such as "turn on" and "turn off") to a voice controlled device 171/172.

This application taught many novel improvements over prior art designs. Accordingly, any combination using just one or all of the novel improvements may be embodied in a wide range of embodiments, as this teaching is not to be limited to the precise embodiments shown and taught herein.

Although several embodiments have been described in detail for purposes of illustration, various modifications may be made to each without departing from the scope and spirit of the invention. Accordingly, the invention is not to be limited, except as by the appended claims.

NUMERALS

15 Hall Effect sensor
16 printed circuit board
25 turbine bearing
26 turbine shaft
27 turbine wheel
28 magnet
29 weight
30 rear bearing support
33 fluid pipe section
65 central/axle thru-hole
66 hub
67 longitudinal axis
68 vanes
69 rim
70 root, vane
71 tip, vane
72 peripheral cavity/pocket
73 seal
74 pass through area
76 external vane
78 inside diameter, fluid pipe section
80 tapered transition, rear bearing support
81 housing
82 rotational direction, turbine wheel
83 front face, turbine wheel
84 rear face, turbine wheel
85 front bearing support
86 distance
87 leading edge, rim
88 trailing edge, rim
S1 first signal
S2 second signal
U utility side
H home side
100 monitoring and control system
110 control valve
111 inlet port
112 outlet port
120 valve
130 flow sensor
140 flow sensor
150 electronically operated actuator
160 control module
161 printed circuit board
162 processor
163 memory
164 wireless communication chip
165 timer
166 power port
167 wireless communication connection
168 hard-wired connection
170 user input module
171 remote input device
172 manual input device
173 activation sensor/switch
178 server
180 power module

What is claimed is:

1. A turbine wheel configured for use in a turbine flow meter, the turbine wheel comprising:
   a hub centered about and defining a longitudinal axis, wherein the hub is configured to be freely rotatably fixed in position inside a fluid pipe section;
   a first cylindrical rim centered about the hub and the longitudinal axis and spaced a distance apart from the hub, wherein connection between the hub and the first cylindrical rim is limited to a first set of no more than two vanes each having a root attached to the hub and a tip attached to the first cylindrical rim including a second cylindrical rim centered about the hub and the longitudinal axis and spaced radially a distance apart from the first cylindrical rim, wherein the first and second cylindrical rims are concentrically disposed in relation to one another, and including a second vane set extending outwardly from the first cylindrical rim to the second cylindrical rim, wherein a root of each vane of the second vane set is attached to the first cylindrical rim and a tip of each vane of the second vane set is attached to the second cylindrical rim.

2. The turbine wheel of claim 1, wherein the first vane set is limited to one individual vane.

3. The turbine wheel of claim 1, including an external vane set extending outwardly from the first cylindrical rim, wherein a root of each vane of the external vane set is attached to the first cylindrical rim and a tip of each vane of the external vane set is not attached to any cylindrical rim.

4. The turbine wheel of claim 1, wherein a pocket is formed in the first cylindrical rim, and wherein a magnet or a magnetically-permeable ferrous part is disposed within the pocket.

5. The turbine wheel of claim 1, wherein the hub, the first cylindrical rim, and the first vane set of the turbine wheel are formed as a single-shot, plastic injection molded, homogeneous part.

6. The turbine wheel of claim 5, wherein the single-shot, plastic injection molded, homogeneous part has a specific gravity at or between 0.9 to 1.0.

7. The turbine wheel of claim 5, wherein the single-shot, plastic injection molded, homogeneous part is formed from a polypropylene homopolymer.

8. The turbine wheel of claim 1, wherein the first vane set consists of two individual vanes and the second vane set consists of four individual vanes.

9. The turbine wheel of claim 1, wherein the first vane set consists of two individual vanes and the second vane set comprises more than two individual vanes.

10. The turbine wheel of claim 1, wherein the first vane set consists of one individual vane and the second vane set comprises more than one individual vane.

11. The turbine wheel of claim 1, wherein the first vane set has a lower individual vane count in comparison to the second vane set.

12. The turbine wheel of claim 1, wherein a pocket is formed in the second cylindrical rim, and wherein a magnet or a magnetically-permeable ferrous part is disposed within the pocket.

13. The turbine wheel of claim 1, wherein a leading edge of the first cylindrical rim extends a distance in front of a leading edge of the second cylindrical rim.

14. The turbine wheel of claim 1, wherein the hub, the first and second cylindrical rims, and the first and second vane sets of the turbine wheel are formed as a single-shot, plastic injection molded, homogeneous part.

15. The turbine wheel of claim 1, including an external vane set extending outwardly from the second cylindrical rim to define an outer radial surface of the turbine wheel.

16. A turbine wheel configured for use in a turbine flow meter, the turbine wheel comprising:
   a hub centered about and defining a longitudinal axis, wherein the hub is configured to be freely rotatably fixed in position inside a fluid pipe section;
   a first cylindrical rim centered about the hub and the longitudinal axis and spaced a distance apart from the hub;
   a first vane set extending outwardly from the hub to the first cylindrical rim, wherein a root of each vane of the first vane set is attached to the hub and a tip of each vane of the first vane set is attached to the first cylindrical rim;
   a second cylindrical rim centered about the hub and the longitudinal axis and spaced radially a distance apart from the first cylindrical rim, wherein the first and second cylindrical rims are concentrically disposed in relation to one another;
   a second vane set extending outwardly from the first cylindrical rim to the second cylindrical rim, wherein a root of the each vane of the second vane set is attached to the first cylindrical rim and a tip of each vane of the second vane set is attached to the second cylindrical rim.

17. The turbine wheel of claim 16, wherein the first vane set has a lower individual vane count in comparison to the second vane set.

18. The turbine wheel of claim 17, including a third vane set extending outwardly from the second cylindrical rim, wherein a root of each vane of the third vane set is attached to the second cylindrical rim and a tip of each vane of the third vane set is not attached to any cylindrical rim.

19. The turbine wheel of claim 18, wherein a pocket is formed in the second cylindrical rim, and wherein a magnet or a magnetically-permeable ferrous part is disposed within the pocket.

20. The turbine wheel of claim 19, wherein a leading edge of the first cylindrical rim extends a distance ahead of a leading edge of the second cylindrical rim.

21. The turbine wheel of claim 20, wherein the turbine wheel is a single-shot, plastic injection molded, homogeneous part.

22. The turbine wheel of claim 16, wherein the first vane set consists of two individual vanes and the second vane set consists of four individual vanes.

23. The turbine wheel of claim 16, wherein the first vane set consists of two individual vanes and the second vane set comprises more than two individual vanes.

24. The turbine wheel of claim 16, wherein the first vane set consists of one individual vane and the second vane set comprises more than one individual vane.

25. A turbine wheel configured for use in a turbine flow meter, the turbine wheel comprising:
   a hub centered about and defining a longitudinal axis, wherein the hub is configured to be freely rotatably fixed in position inside a fluid pipe section;
   a first cylindrical rim centered about the hub and the longitudinal axis and spaced a distance apart from the hub;
   a first vane set extending outwardly from the hub to the first cylindrical rim, wherein a root of each vane of the first vane set is attached to the hub and a tip of each vane of the first vane set is attached to the first cylindrical rim, wherein the first vane set consists of two individual vanes; and
   a plastic external vane set extending outwardly from the first cylindrical rim, wherein a root of each vane of the external vane set is attached to the first cylindrical rim and a tip of each vane of the external vane set is not attached to any cylindrical rim wherein the turbine wheel is a single-shot plastic injection molded, homogenous part; wherein a pocket is formed in the first cylindrical rim, and including a magnet or magnetically-permeable ferrous part disposed within the pocket.

26. The turbine wheel of claim 25, wherein an axle thru-hole is disposed through the hub along the longitudinal axis, and including a turbine shaft disposed through the axle thru-hole.

27. A turbine wheel configured for use in a turbine flow meter, the turbine wheel comprising:
   a hub centered about and defining a longitudinal axis, wherein the hub is configured to be freely rotatably fixed in position inside a fluid pipe section;
   a first cylindrical rim centered about the hub and the longitudinal axis and spaced a distance apart from the hub;
   a first vane set extending outwardly from the hub to the first cylindrical rim, wherein a root of each vane of the first vane set is attached to the hub and a tip of each vane of the first vane set is attached to the first cylindrical rim; and
   an external vane set extending outwardly from the first cylindrical rim, wherein a root of each vane of the external vane set is attached to the first cylindrical rim and a tip of each vane of the external vane set is not attached to any cylindrical rim;
   wherein the turbine wheel, including the hub, the first cylindrical rim, the first vane set and the external vane set, is a single-shot, plastic injection molded, homogeneous part wherein a pocket is formed in the first cylindrical rim, and wherein a magnet or magnetically-permeable ferrous part is disposed within the pocket.

28. A turbine wheel configured for use in a turbine flow meter, the turbine wheel comprising:
   a hub centered about and defining a longitudinal axis, wherein the hub is configured to be freely rotatably fixed in position inside a fluid pipe section;
   a first cylindrical rim centered about the hub and the longitudinal axis and spaced a distance apart from the hub;
   a first vane set extending outwardly from the hub to the first cylindrical rim, wherein a root of each vane of the first vane set is attached to the hub and a tip of each vane of the first vane set is attached to the first cylindrical rim;
   wherein the hub, the first cylindrical rim, and the first vane set of the turbine wheel are formed from a polypropylene homopolymer;
   wherein a pocket is formed in the first cylindrical rim; and
   a magnet or a magnetically-permeable ferrous part disposed within the pocket;
   wherein the turbine wheel including the magnet or the magnetically-permeable ferrous part consists of a specific gravity at or between 0.9 to 1.0.

* * * * *